(12) United States Patent
Yang et al.

(10) Patent No.: US 12,369,149 B2
(45) Date of Patent: Jul. 22, 2025

(54) UPLINK RANK ADAPTATION FOR MIMO COMMUNICATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 17/379,990

(22) Filed: Jul. 19, 2021

(65) Prior Publication Data

US 2022/0022223 A1  Jan. 20, 2022

Related U.S. Application Data

(60) Provisional application No. 63/054,217, filed on Jul. 20, 2020, provisional application No. 63/054,227, filed on Jul. 20, 2020.

(51) Int. Cl.
*H04W 72/1268* (2023.01)
*H04L 1/00* (2006.01)
*H04L 5/00* (2006.01)
*H04W 72/23* (2023.01)

(52) U.S. Cl.
CPC ....... *H04W 72/1268* (2013.01); *H04L 1/0025* (2013.01); *H04L 5/0051* (2013.01); *H04W 72/23* (2023.01)

(58) Field of Classification Search
CPC .......... H04W 72/1268; H04W 72/14; H04L 1/0025; H04L 5/0051; H04L 5/0094; H04L 5/0048; H04B 7/0404; H04B 7/0456
See application file for complete search history.

(56) References Cited

U.S. PATENT DOCUMENTS

| 2013/0129014 A1* | 5/2013 | Kim ............. H04L 1/0026 375/295 |
| 2018/0048366 A1* | 2/2018 | Sundararajan ....... H04B 7/0689 |
| 2018/0367986 A1* | 12/2018 | Sundararajan ........ H04W 72/12 |
| 2019/0174527 A1* | 6/2019 | Park ................ H04L 25/0224 |
| 2020/0252111 A1* | 8/2020 | Maamari .............. H04L 5/0055 |

\* cited by examiner

*Primary Examiner* — Dinh Nguyen
(74) *Attorney, Agent, or Firm* — Haynes and Boone, LLP

(57) ABSTRACT

Methods related to wireless communication systems and uplink (UL) rank adaptation are provided. A user equipment (UE) receives, from a base station (BS), a configuration indicating a resource associated with a plurality of UL reference signal ports. The UE determines, based on at least one of an overheating status, a throughput, or a latency, a quantity of transmission layers for a transmission. The UE transmits, to the BS, an indication of at least one of (1) one or more UL reference signal ports of the plurality of UL reference signal resources associated with the UL reference signal resource based on the quantity of transmission layers, or (2) a number of UL reference signal ports associated with the multi-port UL reference signal resource based on the quantity of transmission layers.

14 Claims, 13 Drawing Sheets

UPLINK RANK ADAPTATION FOR MIMO COMMUNICATION

CROSS-REFERENCE TO RELATED APPLICATIONS

The present application claims priority to and the benefit of U.S. Provisional Patent Application No. 63/054,217, filed Jul. 20, 2020 and titled "Uplink Rank Adaptation for Non-Codebook-Based MIMO Communication," and U.S. Provisional Patent Application No. 63/054,227, filed Jul. 20, 2020 and titled "Uplink Rank Adaptation for Codebook-Based MIMO Communication," the disclosure of each of which is incorporated by reference herein in its entirety as if fully set forth below in its entirety and for all applicable purposes.

TECHNICAL FIELD

The technology described below relates generally to wireless communication systems, and more particularly to adapting the number of transmission layers used to transmit data between wireless devices based on operating conditions. Certain embodiments can enable and provide techniques allowing a user equipment to dynamically indicate a preferred number of transmission layers for uplink transmissions adapted to conditions at the user equipment.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. As use cases and diverse deployment scenarios continue to expand in wireless communication, rank adaptation technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) includes receiving, from a base station (BS), a first downlink (DL) reference signal. The method further includes receiving, from the BS, a configuration indicating a plurality of single-port uplink (UL) reference signal resources. The method further includes determining, based on a first measurement of the first DL reference signal, a first quantity of transmission layers for a first non-codebook-based transmission. The method further includes determining, based on at least one of a first overheating status at the UE, a first traffic throughput of the UE, or a first traffic latency of the UE, a second quantity of transmission layers for the first non-codebook-based transmission. The method further includes transmitting, to the BS, an indication of at least one of (1) one or more first single-port UL reference signal resources of the plurality of single-port UL reference signal resources based at least in part on a first minimum quantity of the first quantity of transmission layers and the second quantity of transmission layers, or (2) a number of single-port UL reference signal resources based at least in part on the first minimum quantity.

In an additional aspect of the disclosure, a method of wireless communication performed by a BS includes receiving, from a UE, an indication of a first quantity of transmission layers, the indication indicating at least one of (1) one or more first single-port UL reference signal resources of a plurality of single-port UL reference signal resources or (2) a number of single-port UL reference signal resources. The method further includes transmitting, to the UE, an UL scheduling grant including an UL reference signal resource indicator associated with the first quantity of transmission layers.

In an additional aspect of the disclosure, a UE, includes a transceiver and a processor. The transceiver is configured to receive, from a BS, a first downlink (DL) reference signal. The transceiver is further configured to receive, from the BS, a configuration indicating a plurality of single-port UL reference signal resources. The processor is configured to determine, based on a first measurement of the first DL reference signal, a first quantity of transmission layers for a first non-codebook-based transmission. The processor is further configured to determine, based on at least one of a first overheating status at the UE, a first traffic throughput of the UE, or a first traffic latency of the UE, a second quantity of transmission layers for the first non-codebook-based transmission. The transceiver is further configured to transmit, to the BS, an indication of at least one of (1) one or more first single-port UL reference signal resources of the plurality of single-port UL reference signal resources based at least in part on a first minimum quantity of the first quantity of transmission layers and the second quantity of transmission layers, or (2) a number of single-port UL reference signal resources based at least in part on the first minimum quantity.

In an additional aspect of the disclosure, a BS includes a transceiver configured to receive, from a UE, an indication of a first quantity of transmission layers, the indication indicating at least one of (1) one or more first single-port UL reference signal resources of a plurality of single-port UL reference signal resources, or (2) a number of single-port UL reference signal resources. The transceiver is further configured to transmit, to the UE, an UL scheduling grant including an UL reference signal resource indicator associated with the first quantity of transmission layers.

In an additional aspect of the disclosure, a non-transitory computer-readable medium has program code recorded thereon. The program code includes code for causing a UE to receive, from a BS, a first downlink (DL) reference signal. The program code further includes code for causing the UE to receive, from the BS, a configuration indicating a plurality of single-port UL reference signal resources. The program code further includes code for causing the UE to determine, based on a first measurement of the first DL reference signal, a first quantity of transmission layers for a first non-codebook-based transmission. The program code further includes code for causing the UE to determine, based on at least one of a first overheating status at the UE, a first traffic throughput of the UE, or a first traffic latency of the UE, a second quantity of transmission layers for the first non-codebook-based transmission. The program code further includes code for causing the UE to transmit, to the BS, an indication of at least one of (1) one or more first single-port UL reference signal resources of the plurality of single-port UL reference signal resources based at least in part on a first minimum quantity of the first quantity of transmission layers and the second quantity of transmission layers, or (2) a number of single-port UL reference signal resources based at least in part on the first minimum quantity.

In an additional aspect of the disclosure, a non-transitory computer-readable medium has program code recorded thereon. The program code includes code for causing a BS to receive, from a UE, an indication of a first quantity of transmission layers, the indication indicating at least one of (1) one or more first single-port UL reference signal resources of a plurality of single-port UL reference signal resources, or (2) a number of single-port UL reference signal resources. The program code further includes code for causing the BS to transmit, to the UE, an UL scheduling grant including an UL reference signal resource indicator associated with the first quantity of transmission layers.

In an additional aspect of the disclosure, a UE, includes means for receiving, from a BS, a first downlink (DL) reference signal. The UE further includes means for receiving, from the BS, a configuration indicating a plurality of single-port UL reference signal resources. The UE further includes means for determining, based on a first measurement of the first DL reference signal, a first quantity of transmission layers for a first non-codebook-based transmission. The UE further includes means for determining, based on at least one of a first overheating status at the UE, a first traffic throughput of the UE, or a first traffic latency of the UE, a second quantity of transmission layers for the first non-codebook-based transmission. The UE further includes means for transmitting, to the BS, an indication of at least one of (1) one or more first single-port UL reference signal resources of the plurality of single-port UL reference signal resources based at least in part on a first minimum quantity of the first quantity of transmission layers and the second quantity of transmission layers, or (2) a number of single-port UL reference signal resources based at least in part on the first minimum quantity.

In an additional aspect of the disclosure, a BS includes means for receiving, from a UE, an indication of a first quantity of transmission layers, the indication indicating at least one of (1) one or more first single-port UL reference signal resources of a plurality of single-port UL reference signal resources, or (2) a number of single-port UL reference signal resources. The BS further includes means for transmitting, to the UE, an UL scheduling grant including an UL reference signal resource indicator associated with the first quantity of transmission layers.

In an additional aspect of the disclosure, a method of wireless communication performed by a user equipment (UE) includes receiving, from a base station (BS), a configuration indicating a first multi-port uplink (UL) reference signal resource associated with a plurality of UL reference signal ports. The method further includes determining, based on at least one of a first overheating status at the UE, a first traffic throughput of the UE, or a first traffic latency of the UE, a first quantity of transmission layers for a first codebook-based transmission. The method further includes transmitting, to the BS, an UL reference signal using one or more of the plurality of UL reference signal ports associated with the first multi-port UL reference signal resource based on the first quantity of transmission layers.

In an additional aspect of the disclosure, a method of wireless communication performed by a BS includes receiving, from a UE, an uplink (UL) reference signal from one or more of a plurality of UL reference signal ports associated with a subset of a first multi-port UL reference signal resource.

In an additional aspect of the disclosure, a UE, includes a transceiver and a processor. The transceiver is configured to receive, from a BS, a configuration indicating a first multi-port UL reference signal resource associated with a plurality of UL reference signal ports. The processor is configured to determine, based on at least one of a first overheating status at the UE, a first traffic throughput of the UE, or a first traffic latency of the UE, a first quantity of transmission layers for a first codebook-based transmission. The transceiver is further configured to transmit, to the BS, an UL reference signal using one or more of the plurality of UL reference signal ports associated with the first multi-port UL reference signal resource based on the first quantity of transmission layers.

In an additional aspect of the disclosure, a BS includes a transceiver configured to receive, from a UE, an uplink (UL) reference signal from one or more of a plurality of UL reference signal ports associated with a subset of a first multi-port UL reference signal resource.

In an additional aspect of the disclosure, a non-transitory computer-readable medium has program code recorded thereon. The program code includes code for causing a UE to receive, from a BS, a configuration indicating a first multi-port UL reference signal resource associated with a plurality of UL reference signal ports. The program code further includes code for causing the UE to determine, based on at least one of a first overheating status at the UE, a first traffic throughput of the UE, or a first traffic latency of the UE, a first quantity of transmission layers for a first codebook-based transmission. The program code further includes code for causing the UE to transmit, to the BS, an indication of at least one of (1) one or more first UL reference signal ports of the plurality of UL reference signal ports associated with the first multi-port UL reference signal resource based on the first quantity of transmission layers, or (2) a number of UL reference signal ports associated with the first multi-port UL reference signal resource based on the first quantity of transmission layers.

In an additional aspect of the disclosure, a non-transitory computer-readable medium has program code recorded thereon. The program code includes code for causing a BS to receive, from a UE, an indication of a first quantity of transmission layers. The indication indicates at least one of (1) one or more first UL reference signal ports of a plurality of UL reference signal ports associated with a first multi-port UL reference signal resource, or (2) a number of UL reference signal ports. The program code further includes code for causing the BS to transmit, to the UE, an UL scheduling grant including precoding information associated with the first quantity of transmission layers.

In an additional aspect of the disclosure, a UE includes means for receiving, from a BS, a configuration indicating a first multi-port UL reference signal resource associated with a plurality of UL reference signal ports. The UE further includes means for determining, based on at least one of a first overheating status at the UE, a first traffic throughput of the UE, or a first traffic latency of the UE, a first quantity of transmission layers for a first codebook-based transmission. The UE further includes means for transmitting, to the BS, an indication of at least one of (1) one or more first UL reference signal ports of the plurality of UL reference signal ports associated with the first multi-port UL reference signal resource based on the first quantity of transmission layers, or (2) a number of UL reference signal ports associated with the first multi-port UL reference signal resource based on the first quantity of transmission layers.

In an additional aspect of the disclosure, a BS includes means for receiving, from a UE, an indication of a first quantity of transmission layers. The indication indicates at least one of (1) one or more first UL reference signal ports of a plurality of UL reference signal ports associated with a first multi-port UL reference signal resource, or (2) a number of UL reference signal ports. The BS further includes means for transmitting, to the UE, an UL scheduling grant including precoding information associated with the first quantity of transmission layers.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
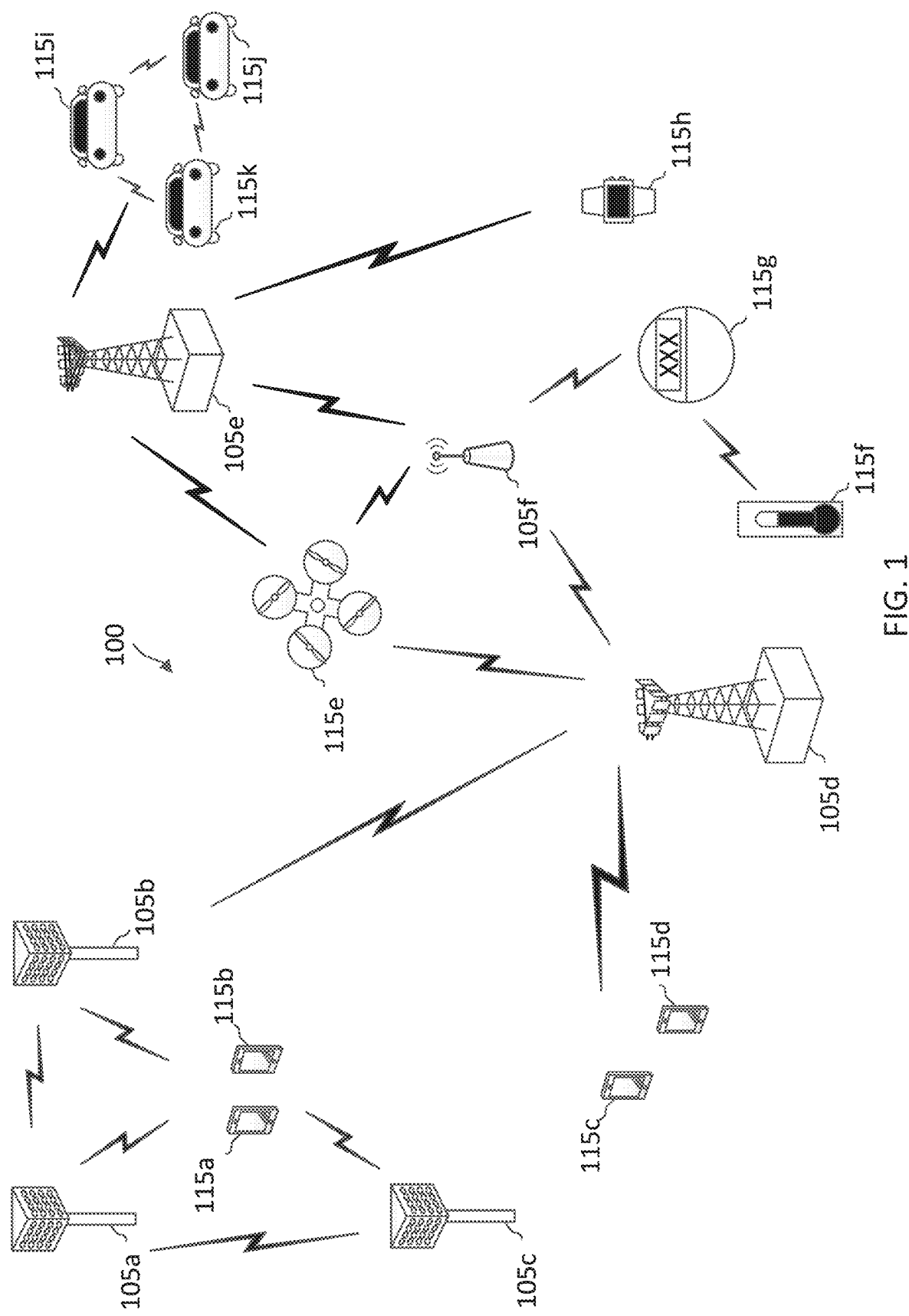
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes mechanisms enabling a user equipment (UE) to adapt the number of layers on which it transmits data based on various operating conditions. A UE in 5G is capable of using multiple antenna ports to communicate with a base station (BS). An antenna port may refer to a physical antenna element or a virtual or logical antenna port formed from multiple physical antenna elements with certain per-antenna element amplitude and/or phase weightings. Using multiple antenna ports allows a UE to transmit signals using multiple spatial layers (e.g., 4 layers or 2 layers), allowing for increased data throughput. In some circumstances, however, it may be desirable for a UE to reduce the number of layers (also known as rank) on which it transmits data, for example, by entering a power-saving mode. For example, the amount of energy (i.e., battery power) consumed by a UE—and the amount of heat generated by the UE's battery—increases as the number of layers used to transmit data (i.e., the rank) increases. To prevent the UE from overheating, it may be beneficial to reduce the transmission rank. In some circumstances, reducing the transmission rank may have little effect on UE performance. For example, when the UE is near the BS, the signal quality may be excellent, and multiple layers may not be needed to support the traffic load from the UE. Similarly, when the UE is stationary or moving slowly, or the channel condition is good, the number of layers may be reduced with little impact on performance. Existing methods of reducing the transmission rank of a UE involve radio resource control (RRC) reconfiguration, which may involve high latency and consume BS resources. Accordingly, embodiments of the present invention allow a UE to dynamically reduce the number of layers it uses to transmit data based on a number of factors that may supersede the importance of data throughput at a given time, without employing RRC reconfiguration.

Figure 2:
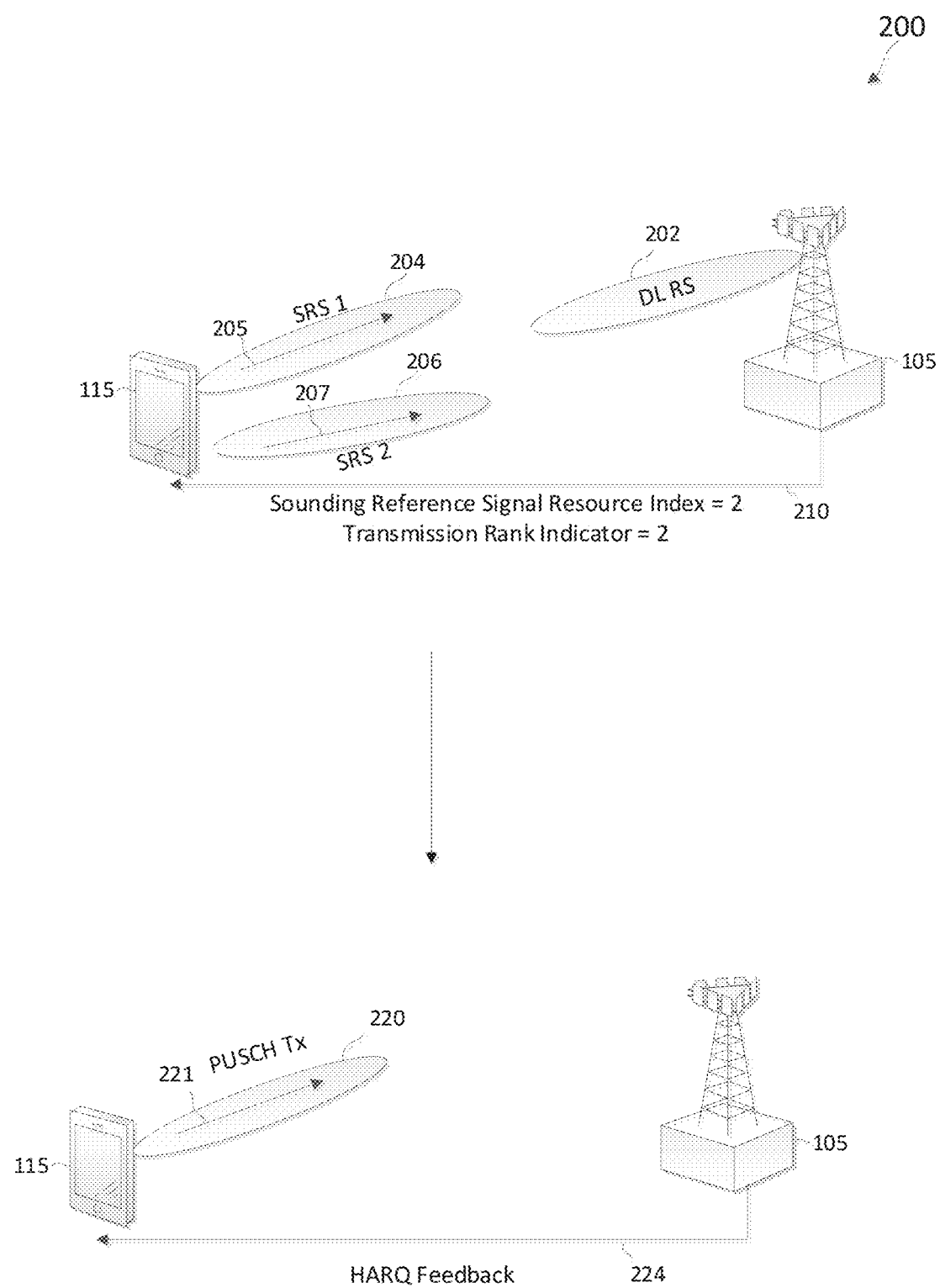
FIG. 2 illustrates a non-codebook-based transmission scheme according to some aspects of the present disclosure.

As described in detail in FIG. 2, non-code-book based transmission may be employed for time division duplexing (TDD) since UL and DL transmissions use the same frequency band, and the UL and DL channels can be characterized by channel reciprocity. UL transmissions may be scheduled by the BS based on indications provided by the UE. For example, the BS may configure the UE with multiple single-port UL reference signal resources (e.g., sounding reference signal (SRS) resources). For example, the UE may support multiple ports, where each port may correspond to an antenna panel at the UE. The number of ports may correspond to a number of spatial layers, multiple-input-multiple output (MIMO) layers, or transmission layers, which may also be referred to as transmission rank. Each of the single-port UL reference signal resources may be configured for transmission by a different port at the UE. The BS may also configure the UE with a one or more DL reference signal resources (e.g., a channel state information reference signal (CSI-RS) resources) for DL reference signal transmissions. The reference signal resource may be spatially associated with the single-port UL reference signal resources. The BS transmits one or more DL reference signals (e.g., CSI-RSs), which the UE may use to perform channel measurement, and based on the channel measurement, the UE may calculate UL precoders. The UE may transmit a pre-coded UL reference signal in each of the single-port UL reference signal resources based on the calculated precoders. The BS may schedule UL transmissions on the PUSCH based on the SRSs. When the UE enters a power-saving mode based on temperature (e.g., the temperature being above a threshold) or other conditions described herein, the UE may reduce the number of SRS resources it uses to transmit SRSs (e.g., transmitting an SRS on fewer layers) to indicate it would prefer to transmit UL data on fewer layers. When the UE exits the power-saving mode, either after a predefined time, or when the conditions are no longer met, the UE may increase the number of SRS resources it uses to transmit (or the number of layers on which it transmits an SRS). For example, a UE may transmit an SRS on 4 layers (e.g., on 4 SRS resources) before determining power-saving conditions are met, reduce the number of layers (e.g., number of SRS resources) it transmits on from 4 to 2 or 1, and after a period of time, increase the number of layers (e.g., number of SRS resources) to 4 again.

According to aspects of the present disclosure, a UE may receive a first DL reference signal (e.g., a channel state information reference signal (CSI-RS)) from a BS, and a configuration indicating a plurality of single-port UL reference signal resources. The UL reference signal resources may be resources on which the UE may transmit UL reference signals to the BS. Each UL reference signal may be a sounding reference signal (SRS), which is a predetermined physical waveform sequence the BS may use for channel measurement. The UE may perform a first measurement using the first DL reference signal. Based on the DL reference signal measurement, the UE may determine a first quantity of transmission layers for a first non-codebook-based transmission.

The first quantity of transmission layers may be the maximum number of layers on which the UE could reliably transmit data to the BS under the current channel condition. The UE may then determine a second quantity of transmission layers based on various factors. The factors may include an overheating status at the UE (e.g., the overheating status could be triggered when the UE temperature exceeds a threshold), a first traffic throughput of the UE (e.g., when the traffic throughput from the UE is high enough that the transmission rank can be reduced), and/or a first latency of the UE (e.g., when the latency associated with transmissions from the UE is low enough that the transmission rank can be reduced). The UE may determine a first minimum quantity based on the first measurement and the various factors, i.e., the first minimum quantity may be the lower of the first quantity of transmission layers and the second quantity of transmission layers. The UE may then transmit to the BS an indication related to the transmission rank. The indication may include at least one of (1) one or more first single-port UL reference signal resources of the plurality of single-port UL reference signal resources based at least in part on the first minimum quantity, or (2) a number of single-port UL reference signal resources based at least in part on the first minimum quantity. In other words, the UE may indicate either specific single-port UL reference signal resources, or a count of single-port UL reference signal resources.

In some aspects, the UE may determine precoding information for the UL reference signals based on the first measurement, and may select the one or more first single-port UL reference signal resources from the plurality of single-port UL reference signal resources based on channel quality associated with the precoding information. For example, the UE may be configured with 4 single-port UL reference signal resources. The UE may calculate a precoding matrix for the 4 single-port UL reference resources based on the channel measurements (e.g., at least the first measurement). The precoding matrix may have four columns, which may be represented by W0, W1, W2, and W3, for example, each corresponding to one beam or spatial direction. The UE may use a performance metric (e.g., reference signal received power (RSRP)) in measuring the DL reference signal to determine which of the single-port UL reference signal resources (e.g., the precoding matrix columns) provides the best performance. The resulting precoding matrix (with the selected matrix column) can be used to encode an UL reference signal for transmission to the BS.

The indication from the UE may be transmitted implicitly or explicitly. For example, the UE may transmit an implicit indication of the first minimum quantity of transmission layers by transmitting an UL reference signal (e.g., an SRS) in each UL reference signal resource of the one or more first single-port UL reference signal resources. The number of UL reference signals transmitted by the UE may indicate the first quantity or the second quantity of transmission layers. In other words, the UE may indicate the transmission rank by transmitting a precoded UL reference signal for each UL reference signal port, where the number of UL reference signals transmitted corresponds to the preferred transmission rank. The UE may transmit a first UL reference signal in a first UL reference signal resource of the one or more first single-port UL reference signal resources, and a different, second, UL reference signal in a second UL reference signal resource of the one or more first single-port UL reference signal resources. Alternately, the UE may transmit an explicit indication to the BS. For example, the UE may transmit the indication in a radio resource control (RRC) message (e.g., in UE Assistance Information (UAI)), media access control-control element (MAC-CE), or a channel state information (CSI) report. The explicit indication may include the preferred number of UL reference signal ports, and/or the preferred UL reference signal ports. In some aspects, the indication transmitted by the UE may indicate fewer reference signal resources than those included in the configuration. For example, the indication may include less than all of the plurality of single-port UL reference signal resources indicated by the configuration, or the indication may include a number of single-port UL reference signal resources that is less than all of the plurality of single-port UL reference signal resources indicated by the configuration. For example, the configuration may indicate 4 single-port UL reference signal resources, and the UE may indicate 1, 2, or 3 of the single-port UL reference signal resources.

Based on the indication transmitted to BS, the UE may receive an UL grant including scheduling information to transmit data on the PUSCH. In some instances, the UE may receive multiple schedules for PUSCH transmissions, where each schedule may indicate a different single-port UL reference signal resource of the configured single-port UL reference signal resources. The UE may select the UL reference signal resource that provides the highest scheduled throughput, latency, or spectrum efficiency to be used when the number of transmission layers is reduced. For example, the UE may receive first scheduling information for only a first single-port UL reference signal resource of the plurality of single-port UL reference signal resources and second scheduling information for only a second single-port UL reference signal resource of the plurality of single-port UL reference signal resources. The UE may then select, based on at least one of a throughput, a latency, or a spectrum efficiency associated with each of the first and second scheduling information, the one or more first single-port UL reference signal resources from the plurality of single-port UL reference signal resources. The UE may receive the first scheduling information in response to transmitting a first indication of the first single-port UL reference signal resource, and the second scheduling information in response to transmitting a second indication of the second single-port UL reference signal resource.

The UE may adjust the number of layers it uses for transmission (i.e., the transmission rank) periodically. For example, the UE may increase the number of layers once the battery overheating status is reset (i.e., once the device temperature drops below a threshold), or if the traffic throughput decreases (e.g., below a threshold), or if the traffic latency increases (e.g., above a threshold). For example, the UE may receive a second DL reference signal from the BS and determine, based on a second measurement of the second DL reference signal, a third quantity of transmission layers for a second non-codebook-based transmission. The UE may also determine based on at least one of a second overheating status at the UE, a second traffic throughput of the UE, or a second traffic latency of the UE, a fourth quantity of transmission layers for the second non-codebook-based transmission. The third quantity of transmission layers may be different from the first quantity of transmission layers, or the fourth quantity of transmission layers may be different from the second quantity of transmission layers. The UE may then transmit to the BS an indication of at least one of (1) one or more second single-port UL reference signal resources of the plurality of single-port UL reference signal resources based on a second minimum quantity of the third quantity of transmission layers and the fourth quantity of transmission layers, or (2) a second number of single-port UL reference signal resources based at least in part on the second minimum quantity.

Figure 3:
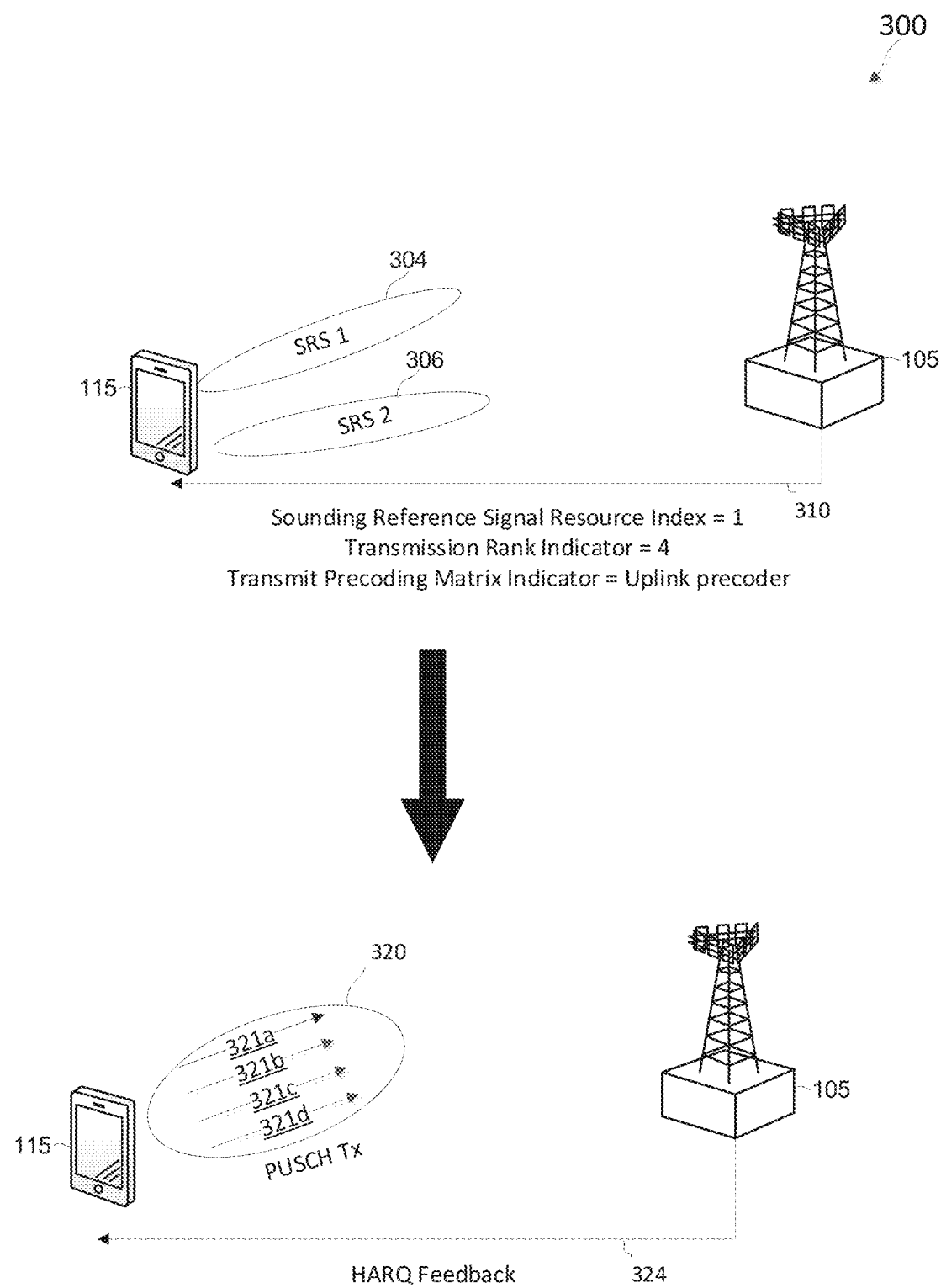
FIG. 3 illustrates a codebook-based transmission scheme according to some aspects of the present disclosure.

As described in detail in FIG. 3, codebook-based transmission may be employed for frequency division duplexing (FDD), in which UL and DL transmissions use different carrier frequencies. A UE may be configured with a codebook defining a set of precoders (i.e., precoding matrices) for use in UL transmissions. A BS may indicate to the UE the precoder to use for an UL transmission when scheduling the UL transmission by specifying (e.g., in downlink control information (DCI)) an index indicating the precoders. The precoders indicated by the BS may be based on the capabilities of the UE (e.g., whether the UE's transmit antenna ports support full coherence, partial coherence, or no coherence). UL transmissions (e.g., the number of transmission layers) may be scheduled by the BS based on indications provided by the UE. For example, the BS may configure the UE with one or more (e.g., 2) multi-port UL reference signal resources (e.g., sounding reference signal (SRS) resources). The UE may support multiple ports, for example, each port may correspond to an antenna panel at the UE. The number of ports may correspond to a number of spatial layers, multiple-input-multiple output (MIMO) layers, or transmission layers, which may also be referred to as a transmission rank. A multi-port UL reference signal resource may refer to a resource including multiple resource elements (REs), where each RE is allocated for a different transmit antenna port of the UE to transmit an UL reference signal. The UE may transmit an UL reference signal (e.g., an SRS) using multiple ports (e.g., 2 ports or 4 ports). Based on the UL reference signals, the BS may perform channel measurements, and based on the channel measurements and a codebook subset restriction (based, for example, on the antenna coherence capabilities of the UE), the BS may determine precoding information and transmission rank for scheduling the UE for an UL transmission. The BS may then indicate as part of an UL grant the precoding information (e.g., in a transmit precoding matrix indicator (TPMI)) and/or transmission rank (e.g., through a transmission rank indicator (TRI)) to be used by the UE for an uplink transmission (e.g., a physical uplink shared channel (PUSCH) transmission). When the UE enters a power-saving mode based on temperature (e.g., the temperature being above a threshold) or other conditions described herein, the UE may reduce the number of SRS ports it uses to transmit SRSs (e.g., transmitting an SRS on fewer ports) to indicate it would prefer to transmit UL data on fewer layers. When the UE exits the power-saving mode, either after a predefined time, or when the conditions are no longer met, the UE may increase the number of SRS ports it uses to transmit an SRS (to indicate the layers or number of layers on which it prefers to transmit PUSCH data). For example, a UE may transmit an SRS on 4 layers (e.g., on 4 SRS ports) before determining power-saving conditions are met, reduce the number of layers (e.g., number of SRS resources) it transmits on from 4 to 2 or 1, and after a period of time, increase the number of layers (e.g., number of SRS ports) to 4 again.

According to aspects of the present disclosure, a UE may receive a configuration from a BS indicating a first multi-port UL reference signal resource associated with a plurality of UL reference signal ports. The UL reference signal resource may be a resource on which the UE may transmit UL reference signals to the BS. Each UL reference signal may be a sounding reference signal (SRS), which is a predetermined physical waveform sequence the BS may use for channel measurement. The UE may then determine a first quantity of transmission layers based on various factors. The factors may include an overheating status at the UE (e.g., the overheating status could be triggered when the UE temperature exceeds a threshold), a first traffic throughput of the UE (e.g., when the traffic throughput from the UE is high enough that the transmission rank can be reduced), and/or a first latency of the UE (e.g., when the latency associated with transmissions from the UE is low enough that the transmission rank can be reduced). The UE may then transmit to the BS an indication related to the transmission rank. The indication may include at least one of (1) one or more first UL reference signal ports of the plurality of UL reference signal ports associated with the first multi-port UL reference signal resource based on the first quantity of transmission layers, or (2) a number of UL reference signal ports associated with the first multi-port UL reference signal resource based on the first quantity of transmission layers. The number of UL reference signal ports may be based on the first quantity of transmission layers. The UE may select the one or more first UL reference signal ports from the plurality of UL reference signal ports based on at least one of a performance metric (e.g., UL throughput, number of UL retransmissions, packet error rate (PER)) or the number of UL reference signal ports. In some instances, the UE may select a port based on historical information (e.g., stored performance information regarding the best port at a previous point in time). For instance, the UE may record a UL throughput and/or number of UL retransmissions (e.g., based on schedules received from the BS 105) for each precoding matrix (TPMI) and corresponding set of antenna ports and select the port(s) that provides the best performance (e.g., highest throughput, lowest retransmission rate and/or lowest PER).

The indication from the UE may be transmitted implicitly or explicitly. For example, the UE may transmit an implicit indication of the one or more first UL reference signal ports by transmitting one or more UL reference signals in the first multi-port UL reference signal resource using the one or more first UL reference signal ports. A number of UL reference signals ports on which the first UL reference signal is transmitted indicates the first quantity of transmission layers. In other words, the UE may indicate the transmission rank by transmitting the first UL reference signal on a number of ports equal to the transmission rank (e.g., the UE may indicate a transmission rank of 2 by transmitting the first UL reference signal on 2 ports). The UE may also or instead transmit in a first UL reference signal port of the one or more UL reference signal ports, a first UL reference signal to the BS and transmit in a second, different, UL reference signal port of the one or more UL reference signal ports, a second UL reference signal while transmitting the first UL reference signal. Alternately, the UE may transmit an explicit indication to the BS. For example, the UE may transmit the indication in a radio resource control (RRC) message (e.g., in UE Assistance Information (UAI)), media access control-control element (MAC-CE), or a channel state information (CSI) report. For example, the explicit indication may indicate which of the one or more first UL reference signal port(s) are preferred, wherein a quantity of the one or more first UL reference signal ports is the same as the first quantity of transmission layers. The explicit indication may also or instead indicate the number of UL reference signal ports, wherein the number of UL reference signal ports is the same as the first quantity of transmission layers.

In some aspects, the indication transmitted by the UE may indicate fewer reference signal ports than those included in the configuration. For example, the indication may include less than all of the plurality of UL reference signal ports associated with the first multi-port UL reference signal resource indicated by the configuration, or the indication may include a number of UL reference signal ports less than all of the plurality of UL reference signal ports associated with the first multi-port UL reference signal resource indicated by the configuration. For example, the configuration may indicate 4 UL reference ports for the first multi-port UL reference signal resource, and the UE may indicate 1, 2, or 3 of the ports by transmitting a UL reference signal in each of the 1, 2, or 3 ports of the first multi-port UL reference signal resource. Each UL reference signal port may correspond to one transmission layer. For example, a quantity of the one or more first UL reference signal ports indicated in the indication may be the same as the first quantity of transmission layers.

The UE may adjust the number of layers it uses for transmission (i.e., the transmission rank) periodically. For example, the UE may increase the number of layers once the battery overheating status is reset (i.e., once the device temperature drops below a threshold), or if the traffic throughput decreases (e.g., below a threshold), or if the traffic latency increases (e.g., above a threshold). The UE may also determine a second quantity of transmission ports for a second codebook-based transmission. For example, the configuration received from the BS may indicate a second multi-port UL reference signal resource associated with a plurality of UL reference signal ports. The UE may determine, based on at least one of a second overheating status at the UE, a second traffic throughput of the UE, or a second traffic latency of the UE, a second quantity of transmission layers for a second codebook-based transmission. The UE may then transmit to the BS an indication of at least one of (1) one or more second UL reference signal ports of the plurality of UL reference signal ports associated with the second multi-port UL reference signal resource based on the second quantity of transmission layers, or (2) a second number of UL reference signal ports associated with the second multi-port UL reference signal resource based on the second quantity of transmission layers.

Based on the indication transmitted to BS, the UE may receive an UL grant including scheduling information to transmit data on the PUSCH. The UL grant may include precoding information (e.g., a transmission precoder matrix indicator (TPMI)) and a transmission rank (e.g., indicated through a transmission rank indicator (TRI)). In some aspects, the UL grant may be further based on transmit-antenna coherency change information transmitted by the UE. For example, the coherency mode at the UE may change from one of a no coherency mode, a partial coherency mode, or a full coherency mode to a different one of the no coherency mode, the partial coherency mode, or the full coherency mode. For instance, the UE may support 4 antenna ports. No coherence may refer to no relative phase being maintained among the UE's antenna ports. Full coherence may refer to all 4 antenna ports at the UE maintaining a relative phase relation among each other over time. Partial coherence may refer to the UE having one pair of ports maintaining a relative phase over time, and no coherence at the other pair of ports. In some instances, the coherency among the UE's antenna ports may change over time, for example, based on channel conditions. The UE may transmit the transmit-antenna coherence change information indicating the change, and receive the UL scheduling grant from the BS. The precoding information in the scheduling grant may be based on the transmit-antenna coherency change information, and the transmission rank indication may be based on the transmitted indication.

By dynamically reducing its transmission rank when the current transmission rank may cause the UE to overheat, or when reducing the transmission rank would have minimal impact on throughput or latency, the UE may increase the life of its battery and prevent heat-related damage to internal components or a user of the UE, without the overhead involved in existing methods that involve RRC reconfiguration. Additionally, indicating which UL reference signal port the UE may prefer in addition to the number of transmissions the UE may prefer can enable the BS to schedule the UE on the UE's preferred ports. Further, utilizing UL reference signal transmission, MAC-CE, and/or CSI reporting (physical layer signaling) can enable fast rank adaptation.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to an UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may determine that reducing the number of layers on which it transmits data to the BS 105 is desirable, for example, when the UE 115 is at risk of overheating, or when battery life may be preserved by reducing the transmission rank without a significant impact on performance (e.g., when throughput would not decrease significantly, or when latency would not increase significantly). For example, the UE 115 may transmit an indication to the BS 105 as part of an RRC or MAC-CE message, or as part of a CSI report, indicating the number of layers on which it prefers transmissions to be scheduled on, or the specific UL reference signal ports/resources on which it prefers to be scheduled on.

The UE 115 may also implicitly indicate the preferred transmission rank by transmitting a number of UL reference signals (each in a single-port UL reference signal resource) equal to the preferred rank, or it may indicate the specific UL reference signal resources by transmitting UL reference signals on those resources. After a period of time, or when the UE determines conditions no longer favor transmitting on fewer layers, the UE may indicate (in similar fashion) a higher preferred transmission rank. The UE 115 may also implicitly indicate the preferred transmission rank by transmitting an UL reference signal in a number of UL reference signal ports associated with a multi-port UL reference signal, where the number of ports used to transmit the signal is equal to the preferred rank. The UE may also indicate the specific UL reference signal ports by transmitting the UL reference signal on those ports. After a period of time, or when the UE determines conditions no longer favor transmitting on fewer layers, the UE may indicate (in similar fashion) a higher preferred transmission rank.

FIG. 2 illustrates a non-codebook-based transmission scheme 200 according to some aspects of the present disclosure. Non-codebook-based transmission relies on time division duplexing (TDD), where UL and DL transmissions share the same frequency, and UL and DL transmissions are characterized by channel reciprocity. As a result, a BS 105 may estimate the DL channel based on the condition of the UL channel, and similarly, a UE 115 may estimate the UL channel based on the condition of the DL channel. In the scheme 200, the BS 105 may configure the UE 105 with multiple single-port SRS resources (e.g., time-frequency resources). The number of configured single-port SRS resources may correspond to the number of layers (e.g., antenna ports) supported by the UE 115. The BS 105 may transmit a DL reference signal 202 to the UE 115. The DL reference signal may be, for example, a CSI-RS. The UE 115 may perform channel measurement based on the DL reference signal 202 and calculate UL precoders based on the channel measurement. For instance, the UL precoders may be precoding matrix, where each column may correspond to an antenna port and may generate a certain beam direction for the antenna port. Using the UL precoders, the UE 115 may transmit a SRS in each of the configured SRS resources. In the illustrate example of FIG. 2, the UE 115 transmits a SRS 204 in a beam direction 205 (using a first SRS resource of the configured SRS resources) and a SRS 206 in a beam direction 207 (using a second SRS resource of the configured SRS resources), where the beam directions 205 and 207 correspond to the UL precoders. Though two SRS resources 204 and 206 are shown, the UE 115 may transmit a different number of SRS resources (e.g., one or four), each SRS resource corresponding to a single SRS port.

There is a one-to-one correspondence between each SRS resources and a UL beam or antenna port at the UE 115. Based on the SRSs (e.g., the SRSs 204 and 205) received in the configured SRS resources, the BS 105 may determine a transmission rank (e.g., a number of the SRS resources) and which of the UL beams or port to be scheduled for an UL transmission. The BS 105, may transmit an indication 210 of the determined SRS resources and transmission rank using an SRS resource indicator (SRI) and transmission rank indicator (TRI), respectively. The indication 210 may be part of an UL grant (e.g., as a DCI message) to the UE 115. In the example shown in FIG. 2, the SRI is equal to 2 (indicating 2 SRS resources are selected), and the TRI indicates a rank of 2. The UE 115 may then transmit a signal 220 in the PUSCH in the direction 221 based on the SRI. As an example, the number of configured SRS resources is 4 and the UL grant (the SRI) indicates a first SRS resource and a second SRS resource of the configured SRS resources. The UE 115 may transmit the PUSCH signal 220 using the same precoding information calculated for the SRSs transmitted (e.g., most recently) in the first SRS resources and the second SRS resources. The BS 105 may provide hybrid automatic repeat request (HARD) feedback 224 related to the signal 220.

FIG. 3 illustrates a codebook-based transmission scheme 300 according to some aspects of the present disclosure. Codebook-based transmission relies on frequency division duplexing (FDD), in which UL and DL transmissions use different carrier frequencies. As a result of using different carrier frequencies, the UL channel is measured separately from the DL channel (i.e., there is no channel reciprocity). A UE 115 may be configured with a codebook defining a set of precoders (i.e., precoding matrices) for use in UL transmissions. A BS 105 may indicate to the UE 115 which precoder to use when scheduling an UL transmission by specifying (e.g., in downlink control information (DCI)) an index indicating the precoders. The precoders indicated by the BS 105 may be based on the transmit-antenna coherency capabilities of the UE 115.

In the scheme 300, the BS 105 may configure the UE 105 with one or more multi-port SRS resources (e.g., time-frequency resources), each associated with a plurality of SRS ports. In some instances, a multi-port SRS resource may include at least one resource element (RE) for each port of the UE 115 to transmit an SRS. The number of SRS ports may correspond to a number of layers supported by the UE.

The UE 115 may transmit an SRS on the indicated SRS resources. For example, UE 115 may transmit SRS 304 on a first multi-port SRS resource (using one antenna panel located at top corner of the UE 115) and SRS 306 on a second multi-port SRS resource (using a second, different antenna panel located at a bottom corner of the UE 115). SRS 304 may be transmitted on one or more ports associated with the first SRS resource and SRS 305 may be transmitted on one or more ports associated with the second SRS resource. For instance, the first SRS resource is configured with four ports and the second SRS resource is configured with four ports, and the UE 115 may transmit an UL reference signal on each of the four ports for each of the first and second SRS resources.

Based on the SRSs 304 and 306, the BS 105 may perform UL channel measurement. Based on the UL channel measurement, the BS 105 may determine one or more UL beams in different beam directions 321 and corresponding precoding and/or one or more transmission layers for the UE 105 to transmit a communication signal 320 (e.g., PUSCH and/or PUCCH signals) on. In some instances, each transmission layer may be transmitted over one beam. In some instances, multiple transmission layers may be transmitted over different polarizations within a beam. The BS 105 may determine a precoder for the UL transmission (e.g., the communication signal 320) from a preconfigured codebook (e.g., a set of precoding matrices). The preconfigured codebook may be known to the BS 105 and the UE 115. In some instances, different subset of precoding matrices in the codebook may be allowed for a full coherence mode, a partial coherence mode, or a no coherence mode. Accordingly, the BS 105 may be restricted to select from certain subset of precoding matrices based on the transmit-antenna coherency capabilities of the UE 115. After determining a precoder (e.g., a precoding matrix) and a transmission rank, the BS 105 may transmit an indication 310 of the precoder (e.g., as a TPMI) and rank (e.g., as a TRI) to the UE 105 as part of an UL grant (e.g., in a DCI). The BS 105 may also include a sounding reference signal resource indicator (SRI) in the UL grant, for example, when the BS 105 configures the UE with multiple multi-port SRS resources (e.g., a first multi-port SRS resource for the SRS 304 and a second, different multi-port SRS resource for the SRS 306). For instance, the first SRS resource may be identified by an SRI value of 1 and the second SRS resource may be identified by an SRI value of 2.

In the example of FIG. 3, the BS has selected a beam corresponding to SRS 304 (with SRI 1), a rank of 4, and a precoder illustrated by the beam directions 321. The UE 115 may then transmit a communication signal 320 to the BS 105 on the PUSCH using a rank of 4 and beam directions 321*a*, 321*b*, 321*c*, and 321*d* from the antenna panel used for transmitting the SRS 304. The BS 105 may provide hybrid automatic repeat request (HARM) feedback 324 related to the signal 320. Though two SRSs 304 and 306 are shown, the UE 115 may transmit a different number of SRSs (e.g., one or four), each SRS corresponding to an SRS resource including multiple ports.

Figure 4:
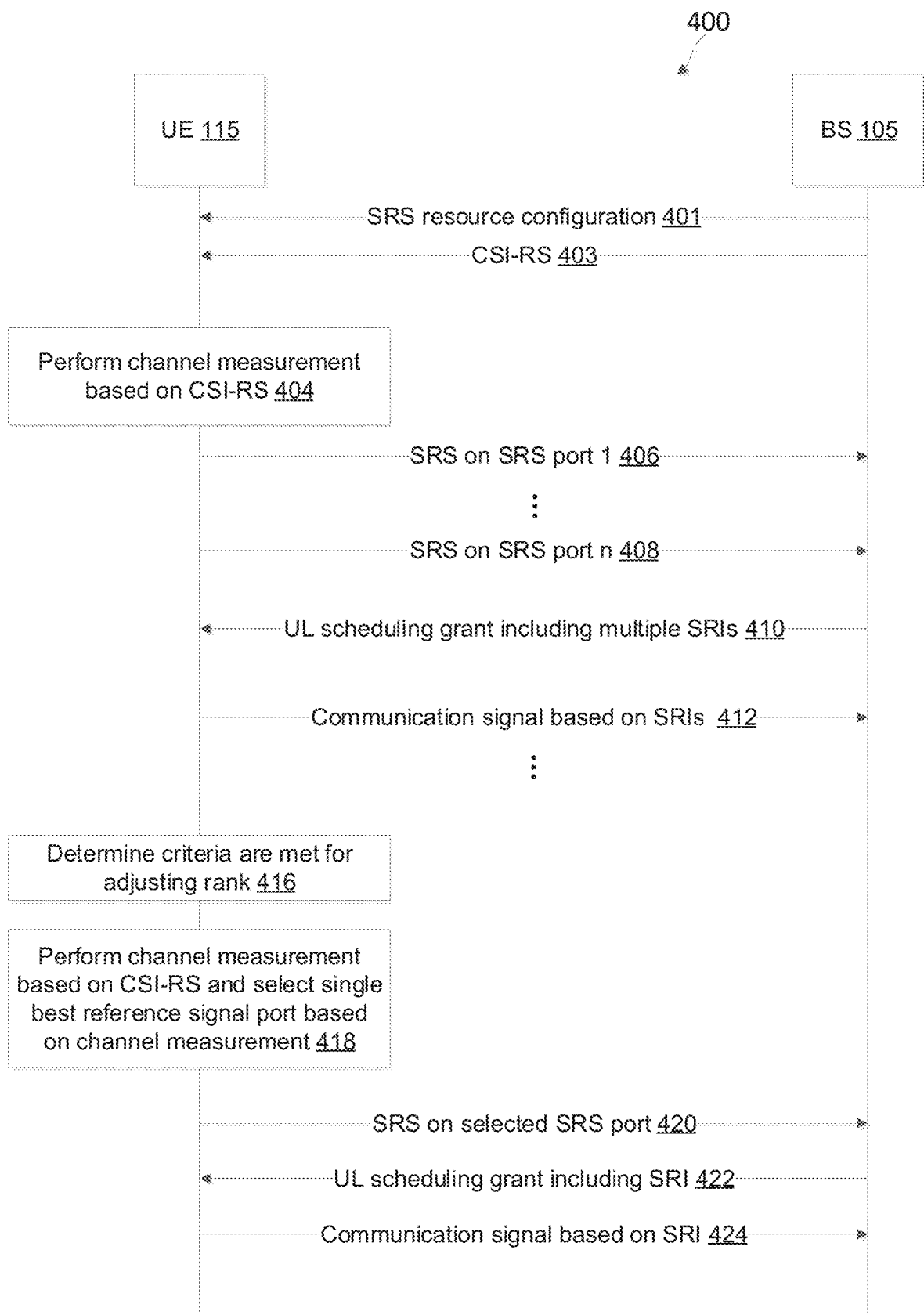
FIG. 4 is an exemplary sequence diagram illustrating a communication sequence according to some aspects of the present disclosure.

FIG. 4 is an exemplary sequence diagram illustrating a communication sequence 400 for non-code-book-based uplink transmissions according to some aspects of the present disclosure. The sequence illustrates a UE 115 transition from normal operation to a power-saving mode based on various criteria. In some aspects, the BS 105 may configure the UE 115 to operate in a non-codebook based UL transmission mode, for example, via a RRC configuration with a ulTxConfig information element (IE) set to "non-code-book". The non-codebook-based UL transmission may be suitable for use in a TDD mode.

At step 401, the BS 105 may transmit a configuration (e.g., a SRS resource configuration) to the UE 115. The configuration may indicate a plurality of single-port UL reference signal resources (e.g., single-port SRS resources in a SRS resources set). The number of single-port UL reference signal resources may correspond to a number of antenna ports supported by the UE 115. Each of the single-port UL reference signal resources may correspond to one of the antenna ports at the UE 115. In other words, the UE 115 may transmit a UL reference signal in one of the single-port UL reference signal resources using a corresponding antenna port. In 3GPP Release 15, the number of single-user (SU) UL MIMO for non-codebook based PUSCH is 4.

At step 403, BS 105 may transmit a DL reference signal (e.g., a CSI-RS as illustrated) to UE 115. For instance, the BS 105 may configure the UE 115 with a NZP CSI-RS resource and may transmit the DL reference signal in the non-zero-power (NZP) CSI-RS resource.

At step 404, the UE 115 performs channel measurements based on the CSI-RS received (in the NZP CSI-RS resource) from the BS 105. The UE 115 may determine UL channel properties (e.g., an UL channel response) based on the CSI-RS received from the BS 105 based on TDD channel reciprocity. The UE 115 may determine a number of transmission layers for UL transmissions based on the channel measurements. The UE 115 may also calculate an UL precoder (e.g., a precoding matrix) based on the CSI-RS measurements. As an example, the UE 115 may have 4 UL reference signal ports or antenna ports (corresponding to 4 layers) and the precoding matrix may have 4 columns (e.g., represented by W0, W1, W2, W3), each corresponding to a digital beam at each antenna port.

In some aspects, the UE 115 may transmit an SRS in each of the single-port UL reference signal resources configured by the BS 105. As shown, at steps 406-408, the UE 115 may transmit an SRS on each port (each single-port SRS resource) for which it is configured. For example, if the UE 115 is configured to transmit on 4 SRS ports (4 single-port SRS resources), the UE 115 may transmit 4 SRS signals, one on each port (i.e., using a different layer for each SRS), the first one at step 406, and the last one at step 408. The UE 115 may apply precoding to each SRS according to a corresponding column (e.g., W0, W1, W2, W3) of the calculated precoding matrix before the transmission. In other words, the SRSs transmitted at step 406-408 are pre-coded SRSs.

At step 410, the BS 105 may transmit an UL scheduling grant to the UE 115 including multiple SRIs. The BS 105 may transmit the grant in a PDCCH DCI. The DCI may include PUSCH resources (e.g., time-frequency resources) and/or transmission parameters (e.g., modulation coding scheme (MCS)) for an UL transmission. The DCI may also include SRIs indicating which SRS resources the UE 115 may reference for transmitting data on the PUSCH. For example, the SRIs may indicate the UE 115 is to transmit on 2 or 4 layers and indicate which SRS resources correspond to the 2 or 4 layers.

At step 412, the UE 115 may transmit a communication signal (e.g., on the PUSCH) using the layers indicated by the SRIs at step 410. The UE 115 may apply precoding to the transmissions using corresponding columns of the precoding matrix calculated at step 404.

At step 416, the UE 115 may determine that criteria are met for adjusting the transmission rank (i.e., the UE 115 may enter power-saving mode). The criteria may include an overheating status at the UE 115 (e.g., triggered when the UE 115 temperature exceeds a threshold), a traffic throughput of the UE 115 (e.g., when the traffic throughput from the UE 115 is high enough that the transmission rank can be reduced), and/or a first latency of the UE 115 (e.g., when the latency associated with transmissions from the UE 115 is low enough that the transmission rank can be reduced). The criteria may in general include a plurality of thresholds, such as a temperature threshold, a battery usage threshold, a throughput threshold, and/or a latency threshold for determining whether a temperature at the UE, a battery usage at the UE, a communication throughput at the UE, and/or a communication latency at the UE, respectively, satisfy a different transmission rank (e.g., a lower transmission rank)

At step 418, the UE 115 may perform channel measurement based on the CSI-RS transmitted at 403, or a later-transmitted CSI-RS. As in step 404, the UE 115 may perform channel measurement for each SRS port for which the UE 115 is configured to transmit on. After performing channel measurement based on each SRS port (corresponding to a layer), the UE 115 may select the best SRS port based on a metric (e.g., the SRS port corresponding to the highest RSRP). In some embodiments, the UE 115 may select multiple SRS ports, though fewer than the total number of ports available.

In some aspects, the UE 115 may determine a first quantity of transmission layers based on the channel quality measurement from the CSI-RS received from the BS 105. The UE 115 may determine a second quantity of transmission layers based on the criteria determined at step 416. The UE 115 may determine a number of layers based on a lower quantity of the first and second quantity of transmission layers.

At step 420, rather than transmit an SRS on each SRS port (each single-port SRS resource) as in steps 406-408, the UE 115 may transmit a single SRS on the SRS resource corresponding to the selected SRS port. As an example, the UE 115 may support 4 layers and may be configured with 4 SRS resources. For instance, SRS resources index 1, 2, 3, 4 may correspond to layers 1, 2, 3, 4, respectively. The UE 115 may compute a precoding matrix with columns W0, W1, W2, and W3 each corresponding to a layer, for example, at step 418. To select layer 1, the UE 115 may transmit an SRS precoded with W0 in the SRS resource index 1. In other words, the SRS transmissions may implicitly indicate the number of SRS ports preferred by the UE 115 and which of the SRS port(s) is preferred by the UE 115.

At step 422, the BS 105 may transmit an UL scheduling grant including an SRI to the UE 115. The SRI may indicate the SRS resource(s) corresponding to the SRS port(s) selected by the UE at step 418.

At step 424, the UE 115 may transmit a communication signal based on the SRI included in the UL scheduling grant (i.e., on the layer(s) with the precoding corresponding to the SRS resource(s) indicated by the SRI).

In some embodiments, the UE 115 may remain in power-saving mode for a predefined period of time. In other embodiments, the UE 115 may remain in power-saving mode until the UE 115 determines the criteria for reducing the rank is no longer met.

In some aspects, the UE 115 may select the best reference signal port (SRS port) at step 418 by indicating to the BS 105 one SRS port (one SRS resource) at a time, for example, in a round-robin manner, computing a latency, performance statistics (e.g., packet error rate, number of retransmissions, number of HARQ ACKs/NACKs), a throughput, and/or spectrum efficiency for each SRS port, and selecting the best SRS port based on the computed latency, performance statistics, throughputs, and/or spectrum efficiency. For instance, the UE 115 may select the best SRS port that provides the lowest latency, the lowest error statistics, the highest throughput, and/or the highest spectrum efficiency.

Figure 5:
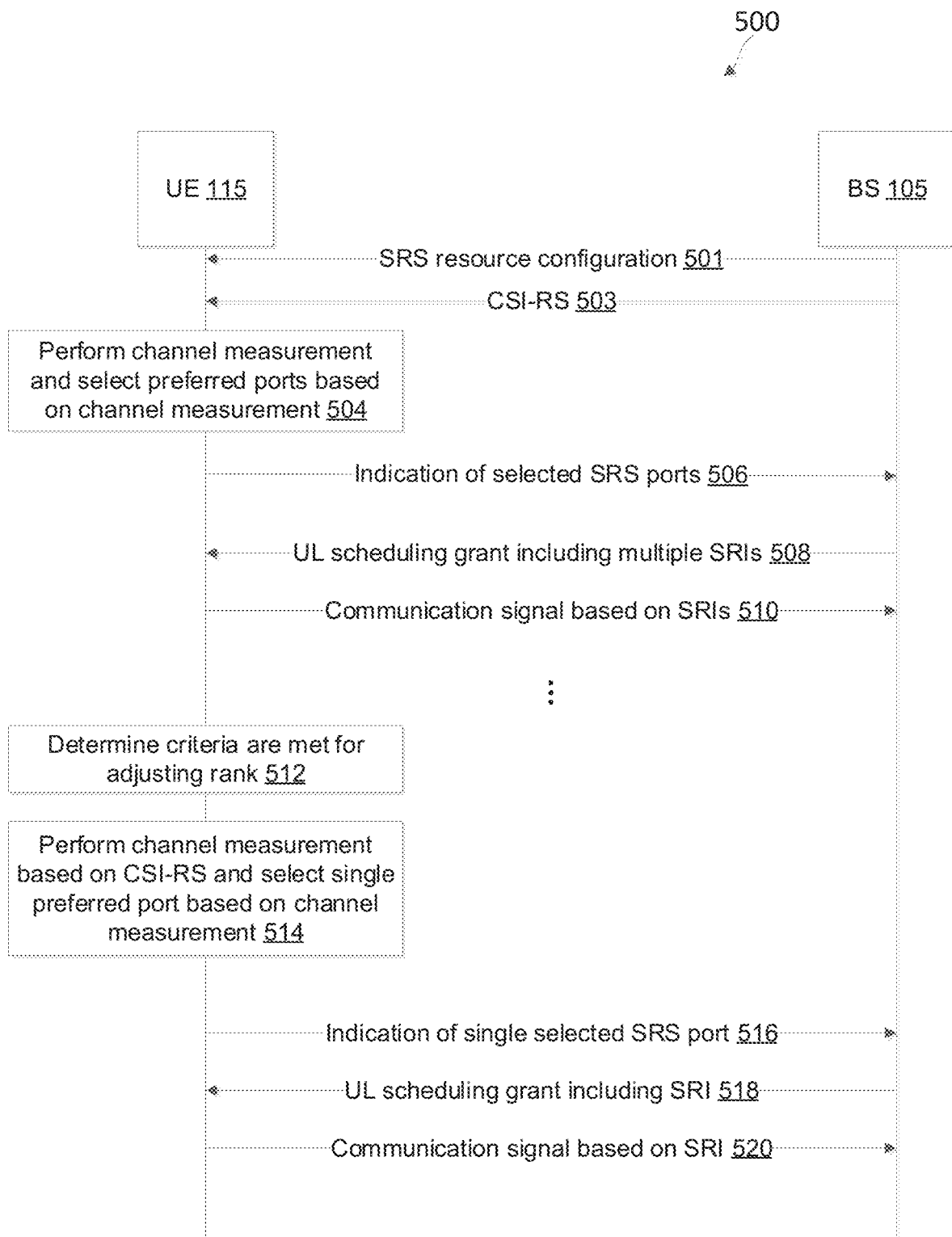
FIG. 5 is an exemplary sequence diagram illustrating a communication sequence according to some aspects of the present disclosure.

FIG. 5 is an exemplary sequence diagram illustrating a communication sequence 500 for non-code-book-based uplink transmissions according to some aspects of the present disclosure. The sequence illustrates a UE 115 transitioning from normal operation to a power-saving mode based on various criteria. Generally speaking, the sequence 500 includes features similar to sequence 400 in many respects. For example, steps 501, 503, 504, 508, 510, 512, and 514 are similar to blocks 401, 403, 404, 410, 412, 416, and 418, respectively.

At step 501, BS 105 may transmit an SRS configuration to the UE 115. The SRS configuration may indicate a plurality of single-port UL reference signal resources (e.g., single-port SRS resources in a SRS resources set), for example, as discussed above in relation to step 401.

At step 503, BS 105 may transmit a DL reference signal (e.g., a CSI-RS as illustrated) to UE 115, for example, as discussed above in relation to step 403.

At step 504, the UE 115 may use the received DL reference signal to perform channel measurement, for example, as discussed above in relation to step 404.

At step 506, UE 115 may transmit an indication of its preferred SRS ports based on the channel measurement at step 504. The UE may transmit the indication in an RRC message (e.g., as part of UAI), a MAC-CE, or a CSI report (e.g., a CSI report based on the CSI-RS received at step 503). In general, the response time for switching the number of transmission layers will be the fastest for physical (PHY) layer signaling (e.g., the CSI report), followed by MAC layer signaling (e.g., the MAC CE), and then RRC layer signaling (e.g., RRC). Accordingly, in some situations, it may be desirable to utilize the MAC layer signaling and/or the PHY layer signaling for the indication to achieve a fast rank adaptation (e.g., when the channel and/or overheating condition changes rapidly).

At step 508, the BS 105 may transmit an UL scheduling grant to the UE 115 including multiple SRIs. The BS 105 may transmit the grant in a PDCCH DCI, and the SRIs may indicate which SRS resources the UE 115 may reference for transmitting data on the PUSCH, for example, as discussed above in relation to step 410. For example, the SRIs may indicate the UE 115 is to transmit on 2 or 4 more layers and indicate which SRS resources correspond to the 2 or 4 layers At step 510, the UE 115 may transmit a communication signal (e.g., on the PUSCH) using the layers indicated by the SRIs at step 508.

At step 512, the UE 115 may determine that criteria are met for adjusting the transmission rank (i.e., the UE 115 may enter the power-saving mode). The criteria may include an overheating status at the UE 115 (e.g., triggered when the UE 115 temperature exceeds a threshold), a traffic throughput of the UE 115 (e.g., when the traffic throughput from the UE 115 is high enough that the transmission rank can be reduced), and/or a first latency of the UE 115 (e.g., when the latency associated with transmissions from the UE 115 is low enough that the transmission rank can be reduced).

At step 514, the UE 115 may perform channel measurement based on the CSI-RS transmitted at 503, or a later-transmitted CSI-RS. As in step 504, the UE 115 may perform channel measurement for each SRS port for which the UE 115 is configured to transmit on. After performing channel measurement based on each SRS port (corresponding to a layer), the UE 115 may select the best SRS port based on a metric (e.g., the SRS port corresponding to the highest RSRP). In some embodiments, the UE 115 may select more than one port, though less than the total number of available ports.

At step 516, the UE 115 may transmit an indication of the SRS port(s) it selected at step 514. The UE may transmit the indication in an RRC message (e.g., in UAI), a MAC-CE transmission, or a CSI report. The indication may include the preferred number of UL reference signal ports, or the preferred UL reference signal ports.

At step 518, the BS 105 may transmit an UL scheduling grant including an SRI to the UE 115. The SRI may indicate the SRS resource(s) corresponding to the SRS port(s) selected by the UE at step 516.

At step 520, the UE 115 may transmit a communication signal based on the SRI included in the UL scheduling grant (i.e., on the layer(s) corresponding to the SRS resource(s) indicated by the SRI).

In some embodiments, the UE 115 may remain in power-saving mode for a predefined period of time. In other embodiments, the UE 115 may remain in power-saving mode until the UE 115 determines the criteria for reducing the rank is no longer met.

Figure 6:
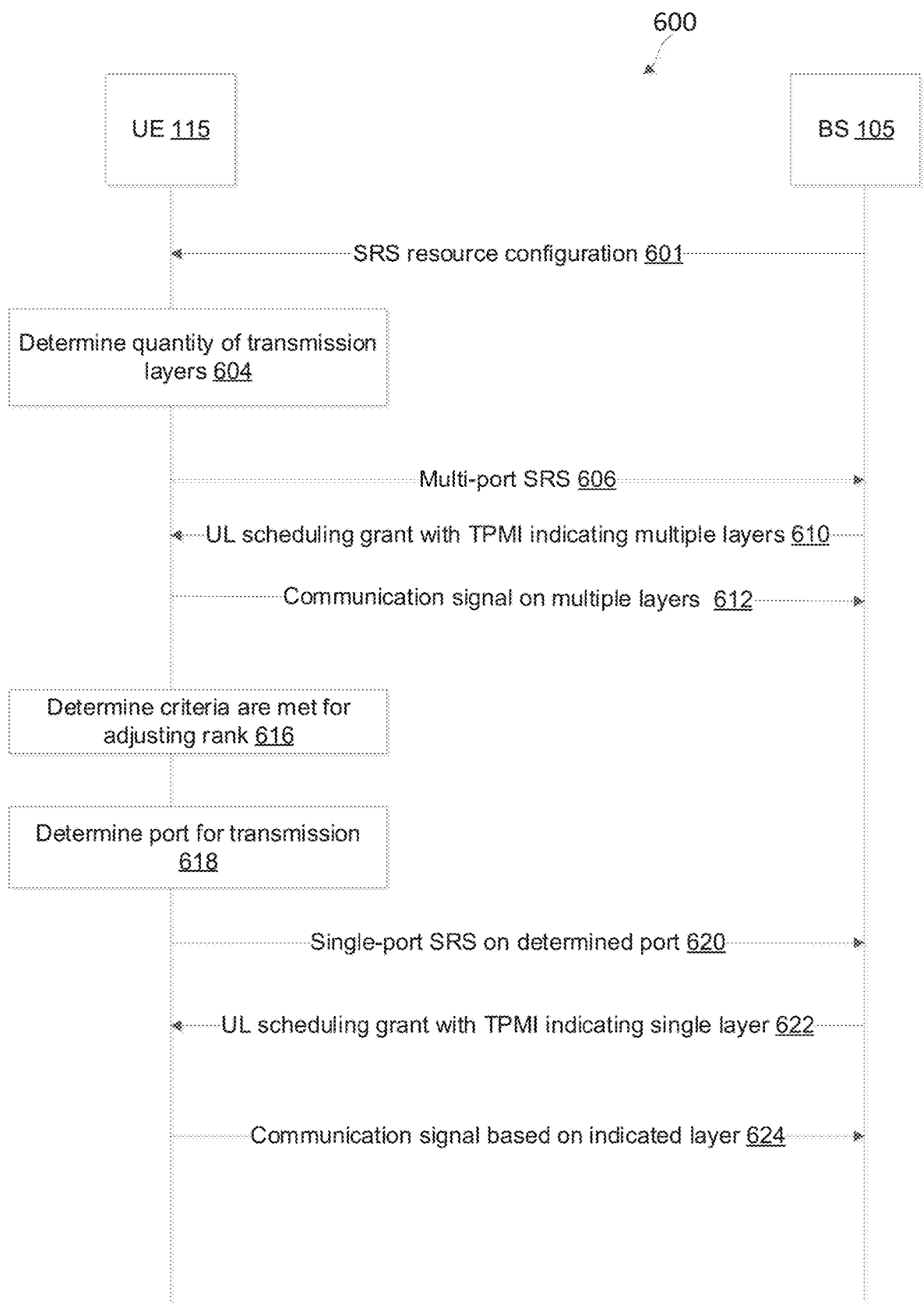
FIG. 6 is an exemplary sequence diagram illustrating a communication sequence according to some aspects of the present disclosure.

FIG. 6 is an exemplary sequence diagram illustrating a communication sequence 600 for codebook-based UL transmissions according to some aspects of the present disclosure. The sequence illustrates a UE 115 transitioning from normal operation to a power-saving mode based on various criteria. In some aspects, the BS 105 may configure the UE 115 to operate in a codebook-based UL transmission mode, for example, via a RRC configuration with a ulTxConfig information element (IE) set to "codebook". The codebook-based UL transmission may be suitable for use in an FDD mode, but may also be used in a TDD mode.

At step 601, the BS 105 may transmit a configuration (e.g., a SRS resource configuration) to the UE 115. The configuration may indicate one or more multi-port UL reference signal resources (e.g., SRS resources) each associated with a plurality of UL reference signal ports (e.g., SRS ports). The number of UL reference signal ports may correspond to a number of antenna ports supported by the UE 115. In some instances, the UE 115 may support four ports, and the multi-port SRS resource may include 4 resource elements (REs) each configured for one antenna port of the UE 115 to transmit an SRS. In 3GPP Release 15, the number of SRS resources codebook based PUSCH is 2 (e.g., for two different antenna panels at the UE 115).

At step 604, the UE 115 may determine a quantity of transmission layers for a codebook-based transmission. For example, the UE 115 may determine to use a transmission layer for each port associated with the reference signal resource. In other words, the UE 115 may determine the quantity of transmission layers based on the number of ports configured for a multi-port SRS resource.

At step 606, the UE 115 may transmit a multi-port SRS on a number of ports corresponding to the quantity of transmission layers determined at step 604. For example, if the configuration transmitted at step 601 indicated an SRS resource with 4 ports and the UE 115 determined to use 4 transmission layers at step 604, the UE 115 may transmit the SRS on each of the 4 ports (i.e., one port per transmission layer).

At step 610, the BS may transmit an UL scheduling grant to the UE 115. The UL grant may include precoding information (e.g., indicated in a TPMI) and a transmission rank (e.g., indicated in a TRI). The precoding information and transmission rank may be based on UL channel measurements performed by BS 105 using the SRS transmitted at step 606, as well as on the coherency mode (e.g., full, partial, or no coherency) used by the UE 115. For example, the UL scheduling grant may be transmitted on the PDCCH as a DCI and include a TRI indicating a rank of 4 and a TPMI indicating which precoder to use. For instance, the TPMI may be a codebook index, and the UE 115 may look up a preconfigured codebook stored at the UE 115 based on the codebook index to retrieve the precoder indicated by the TPMI.

At step 612, the UE 115 may transmit a communication signal (e.g., on the PUSCH) using the layers indicated at step 610. The UE 115 may apply precoding to the transmissions using the precoding matrix (of the codebook) indicated by the TPMI included in the UL grant.

At step 616, the UE 115 may determine that criteria are met for adjusting the transmission rank (i.e., the UE 115 may enter power-saving mode). The criteria may include an overheating status at the UE 115 (e.g., triggered when the UE 115 (a radio frontend (RF) at the UE 115) temperature exceeds a threshold), a traffic throughput of the UE 115 (e.g., when the traffic throughput from the UE 115 is high enough that the transmission rank can be reduced), and/or a first latency of the UE 115 (e.g., when the latency associated with transmissions from the UE 115 is low enough that the transmission rank can be reduced). The criteria may in general include a plurality of thresholds, such as a temperature threshold, a battery usage threshold, a throughput threshold, and/or a latency threshold for determining whether a temperature at the UE, a battery usage at the UE 115, a communication throughput at the UE, and/or a communication latency at the UE, respectively, satisfy a different transmission rank (e.g., a lower transmission rank). Based on the criteria being met, the UE 115 may reduce the preferred number of transmission layers.

At step 618, the UE 115 may determine a preferred port for UL transmission (or a preferred number of ports). For simplicity, the sequence 600 illustrates a sequence where the UE 115 reduces the preferred number of layers to 1 in response to the criteria of step 616 being met, but the UE 115 may also reduce the preferred number of layers to something other than 1 (e.g., from 4 to 3 or 2). The UE 115 may determine the preferred port based on historical data (e.g., performance metrics). For instance, the UE 115 may track and record the UL throughput and/or the number of UL retransmissions (scheduled by the BS 105) for each UL configuration (e.g., for port 1, port 2, port 3, or port 4, various combinations of ports 1, 2, 3, and/or 4 and corresponding TPMIs) based on past UL schedules. In some instances, the BS 105 may also provide feedbacks regarding the UL performance to the UE 115. In an example, the BS 105 may indicate a precoding matrix W0 for port 1 (via TPMI), a precoding matrix W1 for port 2 (via TPMI), a precoding matrix W2 for port 3 (via TPMI), and a precoding matrix W3 for port 4 (via TPMI) over a certain period of time in the past, and the UE 115 may record performance statistics for each port and corresponding precoding matrix. The UE 115 may select a precoding matrix from W0, W1, W2, and W3 that provided a best UL performance based on the performance statistics. The UE 115 may select the port corresponding to the selected precoding matrix.

At step 620, the UE 115 may indicate the preferred port or number of ports by transmitting an SRS on the port determined at step 618. For example, the SRS resource indicated in the configuration may be associated with 4 ports. The UE 115 may transmit the SRS in the second port to indicate it prefers the second port, or it may transmit the SRS on a single port to indicate it prefers a transmission rank of 1. In other words, the UE 115 may implicitly indicate a port by transmitting the SRS on that port, or it may implicitly indicate a number of ports by transmitting the SRS on that number of ports.

At step 622, the BS 105 may transmit a scheduling grant with a TRI indicating a single layer and a TPMI indicating a precoder for a single layer. For example, the TPMI may indicate a precoder for the layer corresponding to the port selected by the UE at step 318, or any single layer (i.e., any one port) if the indication transmitted at step 620 indicated a number of ports (e.g., 1) rather than specific ports.

At step 624, the UE 115 may transmit a communication signal based on the precoder or precoding matrix indicated by the TMPI. For example, the precoding matrix may have non-zero elements corresponding to the port selected by the UE 115. Accordingly, the UE 115 may apply the precoder or precoding matrix to generate the communication signal so that the communication signal may be transmitted at the single port selected by the UE 115.

In some embodiments, the UE 115 may remain in power-saving mode for a predefined period of time. In other embodiments, the UE 115 may remain in power-saving mode until the UE 115 determines the criteria for reducing the rank is no longer met.

Figure 7:
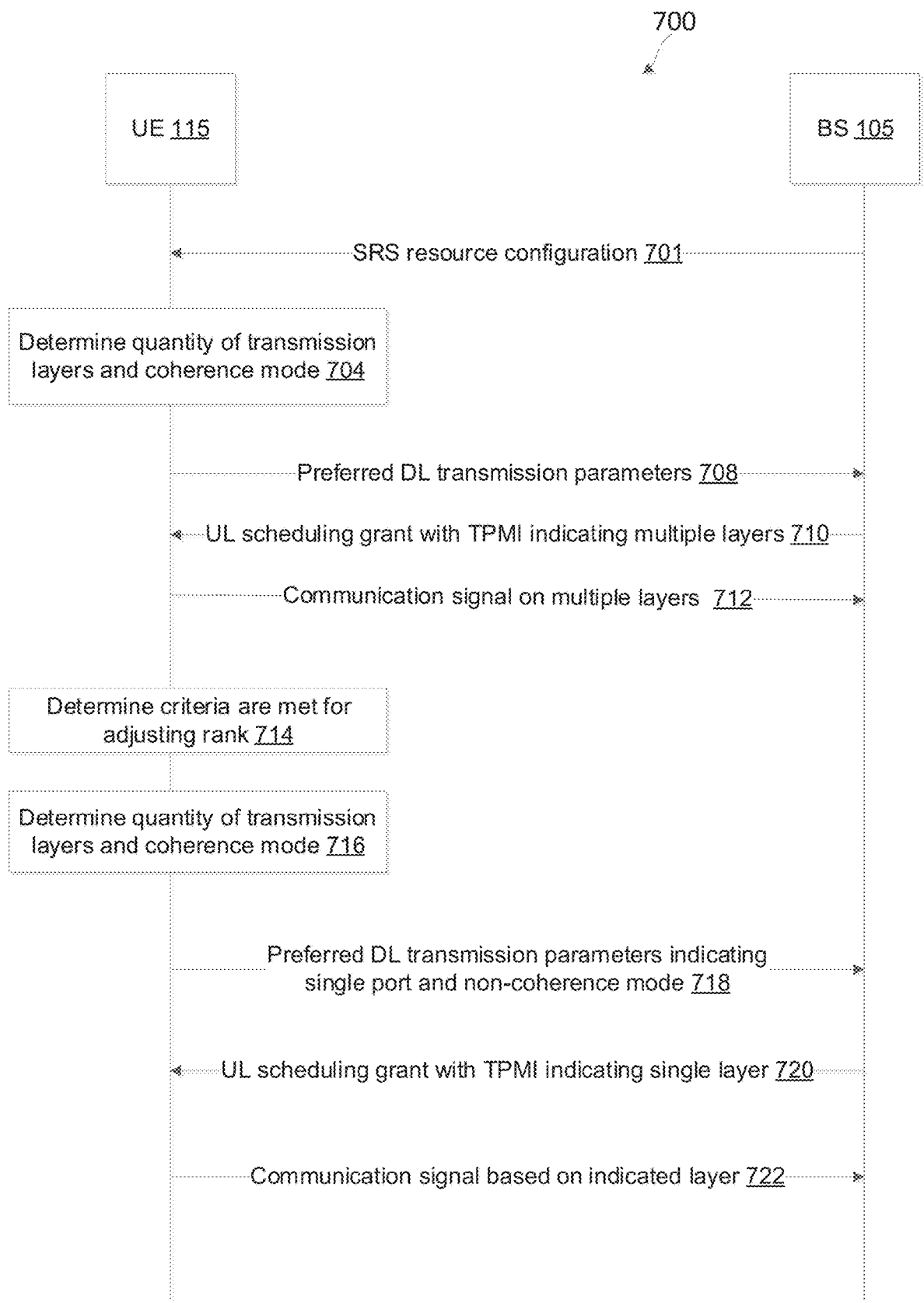
FIG. 7 is an exemplary sequence diagram illustrating a communication sequence according to some aspects of the present disclosure.

FIG. 7 is an exemplary sequence diagram illustrating a communication sequence 700 for codebook-based uplink transmissions according to some aspects of the present disclosure. The sequence 700 illustrates a UE 115 transitioning from normal operation to a power-saving mode based on various criteria. Generally speaking, the sequence 700 includes features similar to sequence 600 in many respects. For example, steps 701, 704, 708, 710, 712, and 714 are similar to blocks 601, 604, 606, 610, 612, and 616 respectively.

At step 701, the BS 105 may transmit a configuration (e.g., a SRS resource configuration) to the UE 115. The configuration may indicate one or more multi-port UL reference signal resources (e.g., SRS resources) each associated with a plurality of UL reference signal ports (e.g., SRS ports), for example, as discussed above in relation to step 601.

At step 704, the UE 115 may determine a quantity of transmission layers (e.g., corresponding specific ports or a number of ports) for a codebook-based transmission, for example, as discussed above in relation to step 604. The UE 115 may also determine a coherence mode (e.g., a full coherence mode, partial coherence mode, or no coherence mode).

At step 708, UE 115 may transmit an indication of its preferred SRS ports and any change in coherence mode. The UE may transmit the indication in an RRC message (e.g., as part of UAI), a MAC-CE, or a CSI report. In general, the response time for switching the number of transmission layers will be the fastest for physical (PHY) layer signaling (e.g., the CSI report), followed by MAC layer signaling (e.g., the MAC CE), and then RRC layer signaling (e.g., RRC). Accordingly, in some situations, it may be desirable to utilize the MAC layer signaling and/or the PHY layer signaling for the indication to achieve a fast rank adaptation (e.g., when the channel and/or overheating condition changes rapidly).

At step 710, the BS 105 may transmit an UL scheduling grant to the UE 115 indicating multiple layers (e.g., with a TRI indicating the number of layers and a TPMI indicating a UL precoder). The BS 105 may transmit the grant in a PDCCH DCI, and the grant may include a TRI indicating a transmission rank and a TPMI indicating precoding information corresponding to the layers for transmitting data on the PUSCH, for example, as discussed above in relation to step 610. For example, the UL grant may indicate the UE 115 is to transmit on 2 or 4 layers and indicate which SRS ports correspond to the 2 or 4 layers (e.g., implicitly via the TPMI).

At step 712, the UE 115 may transmit a communication signal (e.g., on the PUSCH) using the layers indicated by the SRIs at step 710.

At step 714, the UE 115 may determine that criteria are met for adjusting the transmission rank (i.e., the UE 115 may enter the power-saving mode). The criteria may include an overheating status at the UE 115 (e.g., triggered when the UE 115 temperature exceeds a threshold), a traffic throughput of the UE 115 (e.g., when the traffic throughput from the UE 115 is high enough that the transmission rank can be reduced), and/or a first latency of the UE 115 (e.g., when the latency associated with transmissions from the UE 115 is low enough that the transmission rank can be reduced).

At step 716, the UE 115 may determine a preferred port for UL transmission (or a preferred number of ports). For simplicity, the sequence 700 illustrates a sequence where the UE 115 reduces the preferred number of layers to 1 in response to the criteria of step 714 being met, but the UE 115 may also reduce the preferred number of layers to something other than 1 (e.g., from 4 to 3 or 2). The UE 115 may determine the preferred port based on historical data as discussed above in relation to step 618.

At step 718, the UE 115 may transmit an indication of the SRS port(s) it selected at step 716. The UE may transmit the indication in an RRC message (e.g., in UAI), a MAC-CE transmission, or a CSI report. The indication may include the preferred number of UL reference signal ports, or the preferred UL reference signal ports.

At step 720, the BS 105 may transmit an UL scheduling grant including a TPMI to the UE 115. The TPMI may indicate precoding information corresponding to the SRS port(s) selected by the UE at step 716.

At step 722, the UE 115 may transmit a communication signal based on the TPMI included in the UL scheduling grant (i.e., on the port(s) corresponding to the precoding information indicated by the TPMI).

In some embodiments, the UE 115 may remain in a power-saving mode for a predefined period of time. In other embodiments, the UE 115 may remain in power-saving mode until the UE 115 determines the criteria for reducing the rank is no longer met.

In some aspects, in the methods 600 and/or 700, the UE 115 may also detect a change in coherency among the transmit antenna ports at the UE 115 over time (e.g., due to channel variations and/or a RF condition at the UE 115). Upon detecting the coherence change, the UE 115 may indicate to the BS 105 of the coherence change, for example, from one of a full coherence mode, a partial coherence mode, or a no coherence mode to a different one of the full coherence mode, partial coherence mode, or no coherence mode. Upon receiving the coherence change information, the BS 105 may subsequently select a UL precoder for the UE 115 with a codebook restriction in accordance with the coherence change information.

Figure 8:
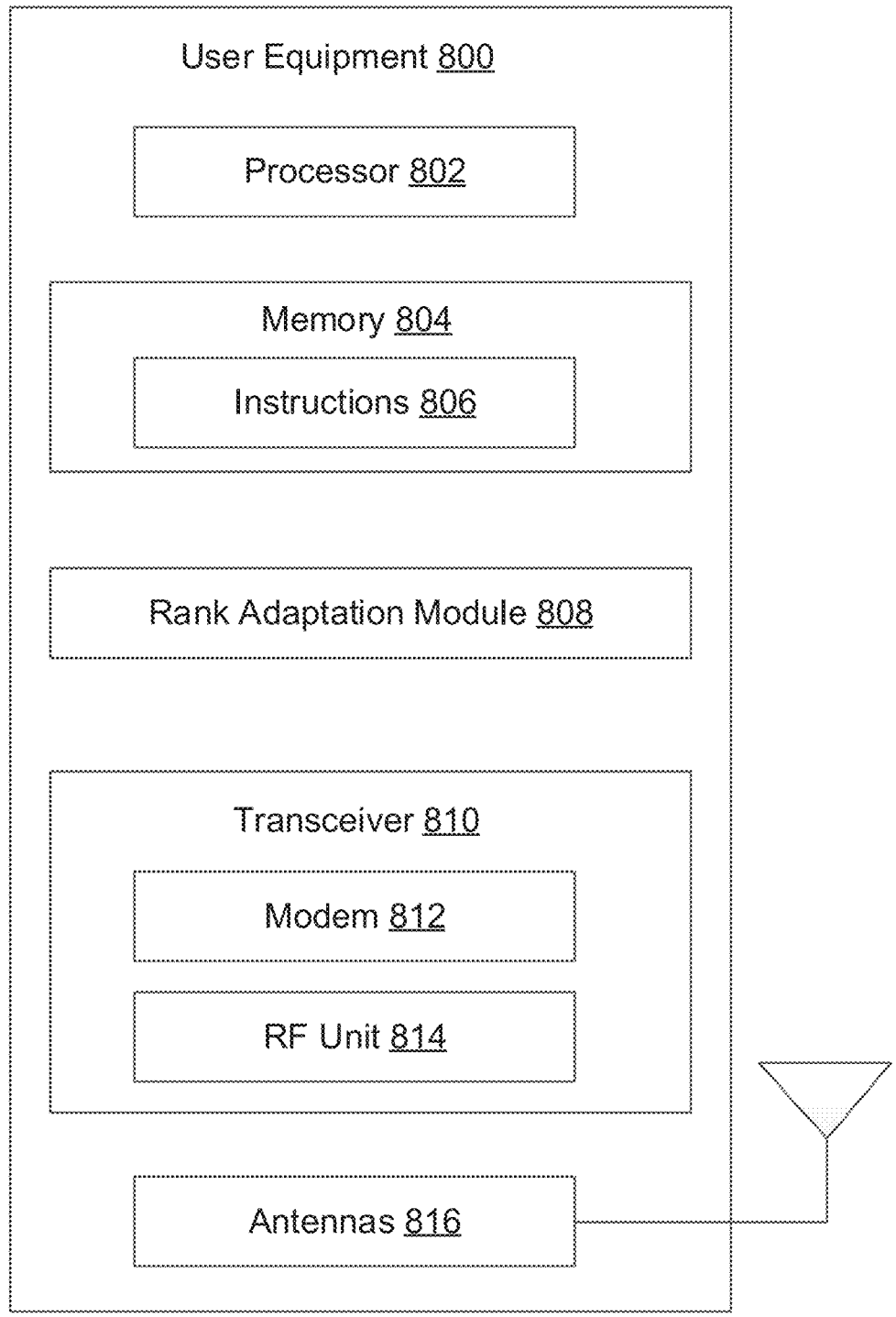
FIG. 8 is a block diagram of an exemplary user equipment according to some aspects of the present disclosure.

FIG. 8 is a block diagram of an exemplary UE 800 according to some aspects of the present disclosure. The UE 800 may be a UE 115 discussed above in FIG. 1. As shown, the UE 800 may include a processor 802, a memory 804, a rank adaptation module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 4-7, 10, and 12. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The rank adaptation module 808 may be implemented via hardware, software, or combinations thereof. For example, the rank adaptation module 808 may be implemented as a processor, circuit, and/or instructions 806 stored in the memory 804 and executed by the processor 802. In some examples, the rank adaptation module 808 can be integrated within the modem subsystem 812. For example, the rank adaptation module 808 can be implemented by a combination of software components (e.g., executed by a DSP or a general processor) and hardware components (e.g., logic gates and circuitry) within the modem subsystem 812. Operations described as being performed by the rank adaptation module 808 may be performed by, or in conjunction with, a different module, e.g., the transceiver 810.

The rank adaptation module 808 may be used for various aspects of the present disclosure, for example, aspects of FIGS. 4-8, 10, and 12. For example, the rank adaptation module 808 may be configured to receive (e.g., in coordination with the transceiver 810), from a BS 105, a first DL reference signal (e.g., CSI-RS) and a configuration indicating a plurality of single-port UL reference signal resources. The UL reference signal resources may be resources on which the UE 115 may transmit UL reference signals to the BS. Each UL reference signal may be an SRS (i.e., a predetermined physical waveform sequence the BS may use for channel measurement). The rank adaptation module 808 may perform a first measurement using the first DL reference signal. Based on the DL reference signal measurement, the rank adaptation module 808 may determine a first quantity of transmission layers for a first non-codebook-based transmission. The first quantity of transmission layers may be the maximum number of layers on which the UE 115 could reliably transmit data to the BS 105 under the current channel condition.

The rank adaptation module 808 may then determine a second quantity of transmission layers based on various factors. The factors may include an overheating status at the UE 115 (e.g., the overheating status could be triggered when the UE temperature exceeds a threshold), a first traffic throughput of the UE 115 (e.g., when the traffic throughput from the UE is high enough that the transmission rank can be reduced), and/or a first latency of the UE 115 (e.g., when the latency associated with transmissions from the UE 115 is low enough that the transmission rank can be reduced). The rank adaptation module 808 may determine a first minimum quantity based on the first measurement and the various factors, i.e., the first minimum quantity may be the lower of the first quantity of transmission layers and the second quantity of transmission layers. The rank adaptation module 808 may then transmit (e.g., in combination with the transceiver 810) to the BS 105 an indication related to the transmission rank. The indication may include at least one of (1) one or more first single-port UL reference signal resources of the plurality of single-port UL reference signal resources based at least in part on the first minimum quantity, or a number of single-port UL reference signal resources based at least in part on the first minimum quantity. In other words, the UE may indicate either specific single-port UL reference signal resources, or a count of single-port UL reference signal resources.

The rank adaptation module 808 may also be configured to determine precoding information for the UL reference signals based on the first measurement and may select the one or more first single-port UL reference signal resources from the plurality of single-port UL reference signal resources based on channel quality associated with the precoding information. For example, for a precoding matrix with four columns W0, W1, W2, and W3, the rank adaptation module 808 may use a performance metric (e.g., RSRP) in measuring the DL reference signal to determine which column in the precoding matrix provides the best performance. The resulting precoding matrix (with the selected single column) can be used to encode an UL reference signal for transmission (using the transceiver 810) to the BS 105.

The rank adaptation module 808 may be configured to transmit the indication implicitly. For example, the rank adaptation module 808 may transmit (in combination with the transceiver 810) an implicit indication of the first minimum quantity of transmission layers by transmitting an UL reference signal (e.g., an SRS) in each UL reference signal resource of the one or more first single-port UL reference signal resources. The number of UL reference signals may indicate the first quantity or the second quantity of transmission layers. In other words, the rank adaptation module 808 may indicate the transmission rank by transmitting a precoded UL reference signal for each UL reference signal port, where the number of UL reference signals transmitted corresponds to the preferred transmission rank. The rank adaptation module 808 may transmit a first UL reference signal in a first UL reference signal resource of the one or more first single-port UL reference signal resources, and a different, second, UL reference signal in a second UL reference signal resource of the one or more first single-port UL reference signal resources The rank adaptation module 808 may also be configured to transmit (in combination with the transceiver 810) the indication explicitly. The rank adaptation module 808 may transmit the indication in an RRC message (e.g., in UAI), a MAC-CE transmission, or a CSI report. The explicit indication may include the preferred number of UL reference signal ports, or the preferred UL reference signal ports. The indication may indicate fewer reference signal resources than those included in the configuration. For example, the indication may include less than all of the plurality of single-port UL reference signal resources indicated by the configuration, or the indication may include a number of single-port UL reference signal resources that is less than all of the plurality of single-port UL reference signal resources indicated by the configuration.

The rank adaptation module 808 may also be configured to receive (in combination with the transceiver 810) an UL grant from the BS 105 including scheduling information to transmit data on the PUSCH. The UL grant may be based on the indication transmitted to BS 105. In some instances, the rank adaptation module 808 may receive more than one scheduling information transmission from the BS 105, each corresponding to a single-port UL reference signal resource, and the rank adaptation module 808 may select the UL reference signal resource that provides the highest scheduled throughput, latency, or spectrum efficiency. For example, the rank adaptation module 808 may receive first scheduling information for only a first single-port UL reference signal resource of the plurality of single-port UL reference signal resources and second scheduling information for only a second single-port UL reference signal resource of the plurality of single-port UL reference signal resources. The rank adaptation module 808 may then select, based on at least one of a throughput, a latency, or a spectrum efficiency associated with each of the first and second scheduling information, the one or more first single-port UL reference signal resources from the plurality of single-port UL reference signal resources. The rank adaptation module 808 may receive the first scheduling information in response to transmitting a first indication of the first single-port UL reference signal resource, and the second scheduling information in response to transmitting a second indication of the second single-port UL reference signal resource.

The rank adaptation module 808 may adjust the number of layers it uses for transmission (i.e., the transmission rank) periodically. For example, the rank adaptation module 808 may increase the number of layers once the battery overheating status is reset (i.e., once the device temperature drops below a threshold), or if the traffic throughput decreases (e.g., below a threshold), or if the traffic latency increases (e.g., above a threshold). For example, the rank adaptation module 808 may receive a second DL reference signal from the BS 105 and determine, based on a second measurement of the second DL reference signal, a third quantity of transmission layers for a second non-codebook-based transmission. The rank adaptation module 808 may also determine based on at least one of a second overheating status at the UE 115, a second traffic throughput of the UE 115, or a second traffic latency of the UE 115, a fourth quantity of transmission layers for the second non-codebook-based transmission. The third quantity of transmission layers may be different from the first quantity of transmission layers, or the fourth quantity of transmission layers may be different from the second quantity of transmission layers.

The rank adaptation module 808 may then transmit to the BS 105 an indication of at least one of (1) one or more second single-port UL reference signal resources of the plurality of single-port UL reference signal resources based on a second minimum quantity of the third quantity of transmission layers and the fourth quantity of transmission layers, or (2) a second number of single-port UL reference signal resources based at least in part on the second minimum quantity.

In another example, the rank adaptation module 808 may be configured to receive (e.g., in coordination with the transceiver 810) a configuration from a BS 105 indicating a first multi-port UL reference signal resource associated with a plurality of UL reference signal ports. The UL reference signal resource may be a resource on which the UE may transmit UL reference signals to the BS 105. Each UL reference signal may be an SRS that the BS 105 may use for channel measurement. The rank adaptation module 808 may then determine a first quantity of transmission layers based on various factors. The factors may include an overheating status at the UE (e.g., the overheating status could be triggered when the UE temperature exceeds a threshold), a first traffic throughput of the UE (e.g., when the traffic throughput from the UE is high enough that the transmission rank can be reduced), and/or a first latency of the UE (e.g., when the latency associated with transmissions from the UE is low enough that the transmission rank can be reduced). The rank adaptation module 808 may then transmit (in coordination with the transceiver 810) to the BS 105 an indication related to the transmission rank. The indication may include at least one of (1) one or more first UL reference signal ports of the plurality of UL reference signal ports associated with the first multi-port UL reference signal resource based on the first quantity of transmission layers, or (2) a number of UL reference signal ports associated with the first multi-port UL reference signal resource based on the first quantity of transmission layers. The number of UL reference signal ports may be based on the first quantity of transmission layers. The rank adaptation module 808 may select the one or more first UL reference signal ports from the plurality of UL reference signal ports based on at least one of a performance metric or the number of UL reference signal ports. The rank adaptation module 808 may also select a port based on historical performance information (e.g., stored information regarding the best port at a previous point in time).

The rank adaptation module 808 may be configured to transmit the indication implicitly. For example, the rank adaptation module 808 may transmit (e.g., in coordination with the transceiver 810) an implicit indication of the one or more first UL reference signal ports by transmitting one or more UL reference signals in the first multi-port UL reference signal resource using the one or more first UL reference signal ports. A number of UL reference signals ports on which the first UL reference signal is transmitted indicates the first quantity of transmission layers. In other words, the rank adaptation module 808 may indicate the transmission rank by transmitting the first UL reference signal on a number of ports equal to the transmission rank. The number of UL reference signal ports indicated is the same as the first quantity of transmission layers. The rank adaptation module 808 may transmit (e.g., in coordination with the transceiver 810) in a first UL reference signal port of the one or more UL reference signal ports, a first UL reference signal to the BS 105 and transmit in a second, different, UL reference signal port of the one or more UL reference signal ports, a second UL reference signal while transmitting the first UL reference signal. The rank adaption module 808 may also be configured to transmit the indication explicitly. For example, the rank adaption module 808 may transmit (in coordination with the transceiver 810) to the BS 105 the indication in an RRC message (e.g., in UAI), a MAC-CE transmission, or a CSI report. The explicit indication may include the preferred number of UL reference signal ports, and/or the preferred UL reference signal ports. For example, the explicit indication may indicate the one or more first UL reference signal ports, wherein a quantity of the one or more first UL reference signal ports is the same as the first quantity of transmission layers. The explicit indication may also or instead indicate the number of UL reference signal ports, wherein the number of UL reference signal ports is the same as the first quantity of transmission layers.

The indication transmitted by the rank adaptation module 808 may indicate fewer reference signal ports than those included in the configuration. For example, the indication may include less than all of the plurality of UL reference signal ports associated with the first multi-port UL reference signal resource indicated by the configuration, or the indication may include a number of UL reference signal ports less than all of the plurality of UL reference signal ports associated with the first multi-port UL reference signal resource indicated by the configuration. For example, the configuration may indicate 4 UL reference ports, and the UE may indicate 1, 2, or 3 of the ports. Each UL reference signal port may correspond to one transmission layer.

The rank adaptation module 808 may also be configured to adjust the number of layers it uses for transmission (i.e., the transmission rank) periodically. For example, the rank adaptation module 808 may increase the number of layers once the battery overheating status is reset (i.e., once the device temperature drops below a threshold), or if the traffic throughput decreases (e.g., below a threshold), or if the traffic latency increases (e.g., above a threshold). The rank adaptation module 808 may also determine a second quantity of transmission ports for a second codebook-based transmission. For example, the rank adaptation module 808 may determine, based on at least one of a second overheating status at the UE 800, a second traffic throughput of the UE 800, or a second traffic latency of the UE 800, a second quantity of transmission layers for a second codebook-based transmission. The rank adaptation module 808 may then transmit (in coordination with the transceiver 810) to the BS 105 an indication of at least one of (1) one or more second UL reference signal ports of the plurality of UL reference signal ports associated with a second multi-port UL reference signal resource based on the second quantity of transmission layers, or (2) a second number of UL reference signal ports associated with the second multi-port UL reference signal resource based on the second quantity of transmission layers.

The rank adaptation module 808 may also be configured to receive (in coordination with the transceiver 810), based on the indication transmitted to BS 105, an UL grant including scheduling information to transmit data on the PUSCH. The UL grant may include precoding information (e.g., a TPMI) and a transmission rank (e.g., indicated by a TRI). The UL grant may be further based on transmit-antenna coherency change information transmitted by the rank adaptation module 808. For example, the coherency mode at the UE may change from one of a no coherency mode, a partial coherency mode, or a full coherency mode to a different one of the no coherency mode, the partial coherency mode, or the full coherency mode. The rank adaptation module 808 may transmit the antenna coherence change information indicating the change, and receive the UL scheduling grant from the BS 105. The precoding information in the scheduling grant may be based on the transmit-antenna coherency change information, and the transmission rank indication may be based on the transmitted indication.

In some embodiments, the rank adaptation module 808 may be configured to keep the UE 800 in power-saving mode (i.e., transmitting in fewer layers than the maximum possible) for a predefined period of time. In other embodiments, the rank adaptation module 808 may terminate power-saving mode when it determines the criteria for reducing the rank is no longer met.

As shown, the transceiver 810 may include a modem subsystem 812 and an RF unit 814. The transceiver 810 can be configured to communicate bi-directionally with other devices, such as the BSs 105. The modem subsystem 812 may be configured to modulate and/or encode the data from the memory 804 and/or the rank adaptation module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., SRS signals, RRC messages including UAI, MAC CE, CSI reports PUSCH signals, etc.) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RRC configurations, SRS resource configurations, scheduling grants, CSI-RSs, etc.) to the rank adaptation module 808 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

In an example, the transceiver 810 is configured to receive, from a BS 105, a first DL reference signal. The transceiver 810 is further configured to receive, from the BS, a configuration indicating a plurality of single-port UL reference signal resources. The processor 802 is configured to determine, based on a first measurement of the first DL reference signal, a first quantity of transmission layers for a first non-codebook-based transmission. The processor 802 is further configured to determine, based on at least one of a first overheating status at the UE 115, a first traffic throughput of the UE, or a first traffic latency of the UE, a second quantity of transmission layers for the first non-codebook-based transmission. The transceiver 810 is further configured to transmit, to the BS 105, an indication of at least one of (1) one or more first single-port UL reference signal resources of the plurality of single-port UL reference signal resources based at least in part on a first minimum quantity of the first quantity of transmission layers and the second quantity of transmission layers, or (2) a number of single-port UL reference signal resources based at least in part on the first minimum quantity. The processor 802 is configured to select the indication based on at least one of the first quantity or the second quantity, whichever is less.

In another example, the transceiver 810 is configured receive, from a base station (BS), a configuration indicating a first multi-port uplink (UL) reference signal resource associated with a plurality of UL reference signal ports.

Figure 9:
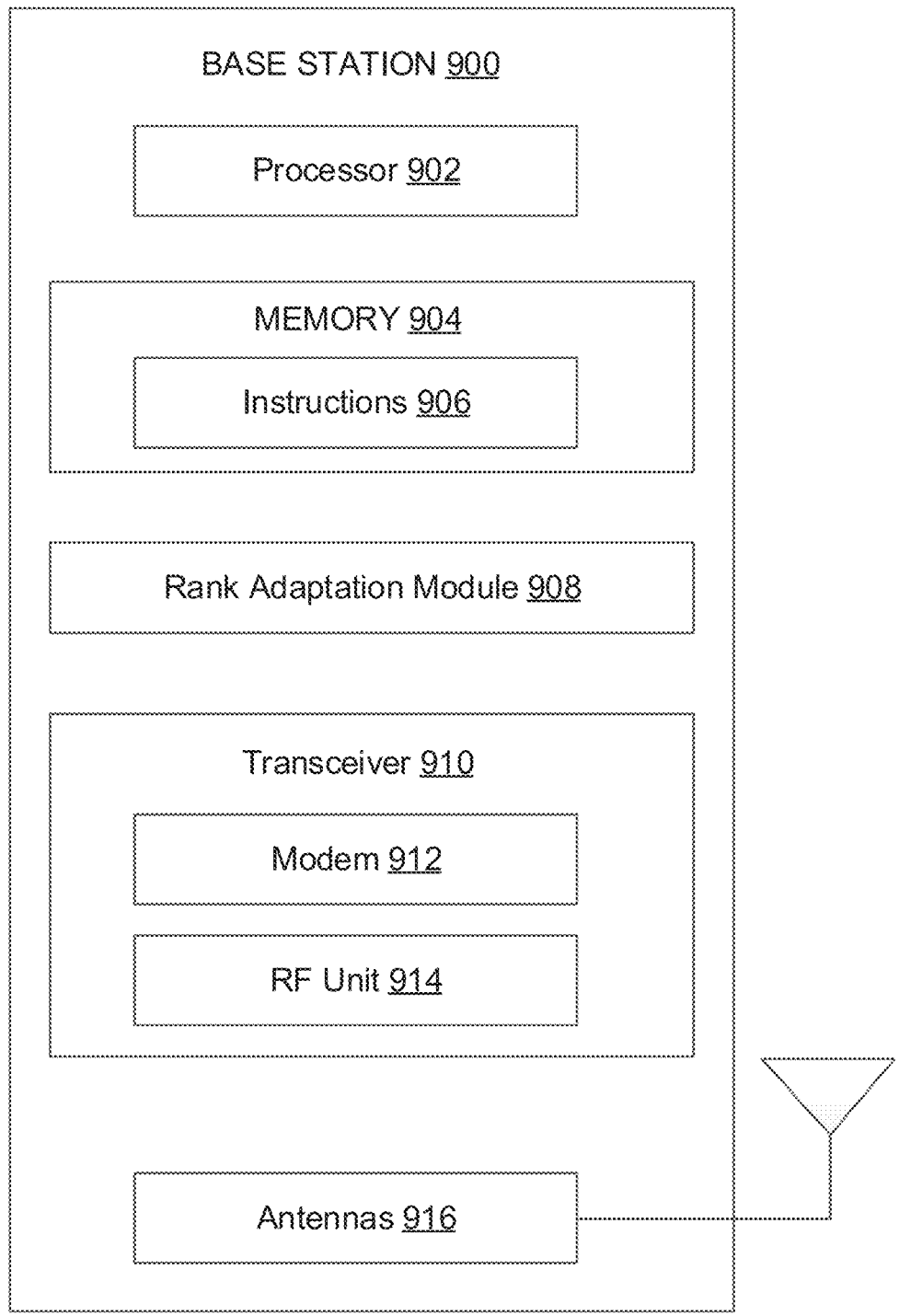
FIG. 9 is a block diagram of an exemplary base station according to some aspects of the present disclosure.

FIG. 9 is a block diagram of an exemplary BS 900 according to some aspects of the present disclosure. The BS 900 may be a BS 105 in the network 100 as discussed above in FIG. 1. As shown, the BS 900 may include a processor 902, a memory 904, a rank adaptation module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 4-7, 11, and 13. Instructions 906 may also be referred to as program code, which may be interpreted broadly to include any type of computer-readable statement(s) as discussed above with respect to FIG. 8.

The rank adaptation module 908 may be implemented via hardware, software, or combinations thereof. For example, the rank adaptation module 908 may be implemented as a processor, circuit, and/or instructions 906 stored in the memory 904 and executed by the processor 902. In some examples, the rank adaptation module 908 can be integrated within the modem subsystem 912. For example, the rank adaptation module 908 can be implemented by a combination of software components (e.g., executed by a DSP or a general processor) and hardware components (e.g., logic gates and circuitry) within the modem subsystem 912.

The rank adaptation module 908 may be used for various aspects of the present disclosure, for example, aspects of FIGS. 4-8, 11, and 13. For example, the rank adaptation module 908 may receive (through the transceiver 910) an indication of a first quantity of transmission layers from a UE 115, indicating the transmission rank and/or the reference signal resources (e.g., SRS resources) the UE 115 would prefer to use during an UL transmission. The indication may indicate one or more first single-port UL reference signal resources of a plurality of single-port UL reference signal resources and/or a number of single-port UL reference signal resources. The rank adaptation module 908 may then transmit an UL scheduling grant including an UL reference signal resource indicator (e.g., an SRI) associated with the first quantity of transmission layers to the UE 115. The indication may be based on channel measurement performed by the UE 115 in response to a DL reference signal transmitted by the BS 105. The rank adaptation module 908 may transmit (through the transceiver 910) to the UE 115 a configuration indicating the plurality of single-port UL reference signal resources from which the UE 115 may choose.

The rank adaptation module 908 may be configured to receive an implicit indication of the first quantity of transmission layers from the UE 115. For example, the rank adaptation module 908 may receive an UL reference signal in each UL reference signal resource of the one or more first single-port UL reference signal resources. The number of UL reference signals (e.g., SRSs) transmitted by the UE 115 may indicate the first quantity of transmission layers. For example, if the rank adaptation module 908 receives (e.g., through the transceiver 910) a single SRS, the rank adaptation module 908 may determine the UE 115 prefers to use a single layer for an UL transmission.

The rank adaptation module 908 may be configured to receive the implicit indication by receiving different UL reference signals in different UL reference signal resources. For example, the rank adaptation module 908 may receive a first UL reference signal from the UE 115 in a first UL reference signal resource of the one or more first single-port UL reference signal resources. The rank adaptation module 908 may then receive a second UL reference signal from the UE 115 in a second (different) UL reference signal resource of the one or more first single-port UL reference signal resources. The single-port UL reference signal resources may indicate to the rank adaptation module 908 which layers (i.e., the layers corresponding to the indicated ports) the UE 115 prefers to transmit an UL communication signal on.

The rank adaptation module 908 may also be configured to receive an explicit indication of the first quantity of transmission layers from the UE 115. For example, the first quantity of transmission layers may be included in an RRC message, a MAC-CE, or a CSI report received by the rank adaptation module 908 (e.g., through the transceiver 910). The explicit indication may indicate the number of transmission layers the UE 115 prefers to transmit UL communications on, and/or which reference signal resources the UE 115 prefers to use.

The indication received by the rank adaptation module 908 may indicate fewer single-port UL reference signal resources than were included in the configuration transmitted by the rank adaptation module 908. For example, the indication may indicate the number of single-port UL reference signal resources preferred by the UE, and the number may be less than all the single-port UL reference signal resources indicated by the configuration. The indication may also indicate specific single-port UL reference signal resources preferred by the UE 115, and the indicated reference signal resources may be less than all the single-port UL reference signal resources indicated by the configuration.

The rank adaptation module 908 may also be configured to receive an indication adjusting or replacing a previous selection of a quantity of transmission layers by a UE 115. For example, the UE 115 may prefer to increase the number of transmission layers after a period of time, or once conditions for operating in power-saving mode are no longer met. The rank adaptation module 908 may receive a second indication of a second quantity of transmission layers different from the first quantity of transmission layers from the UE 115. The second indication may indicate one or more second single-port UL reference signal resources of the plurality of single-port UL reference signal resources and/or or a second number of single-port UL reference signal resources. The rank adaptation module 908 may then transmit a second UL scheduling grant including a second UL reference signal resource indicator associated with the second quantity of transmission layers to the UE 115.

In another example, the rank adaptation module 908 may receive (in coordination with the transceiver 910), an indication of a first quantity of transmission layers from a UE 115, indicating the transmission rank and/or UL reference signal ports (e.g., SRS ports) the UE 115 would prefer to use during an UL transmission. The indication may indicate one or more first UL reference signal ports of a plurality of UL reference signal ports associated with a first multi-port UL reference signal resource, and/or a number of UL reference signal ports. The rank adaptation module 908 may also receive (e.g., in coordination with the transceiver 910) transmit-antenna coherency change information from the UE 115. The transmit-antenna coherency change information may indicate a change from one of a no coherency mode, a partial coherency mode, or a full coherency mode to a different one of the no coherency mode, the partial coherency mode, or the full coherency mode. The rank adaptation module 908 may determine precoding information based on the transmit-antenna coherency change information and a transmission rank indicator based on the indication transmitted by the UE 115. The rank adaptation module 908 may then transmit (through the transceiver 910) an UL scheduling grant including the precoding information (e.g., indicated by a TPMI) associated with the first quantity of transmission layers and the TRI (indicating the transmission rank) to the UE 115. The rank adaptation module 908 may also transmit to the UE 115 a configuration indicating the first multi-port UL reference signal resource.

The rank adaptation module 908 may be configured to receive an implicit indication of the first quantity of transmission layers from the UE 115. For example, the rank adaptation module 908 may receive one or more UL reference signals in the first multi-port UL reference signal resource using the one or more first UL reference signal ports. The number of UL reference signals ports on which the first UL reference signal is transmitted may indicate the first quantity of transmission layers. The rank adaptation module 908 may also receive, from the UE 115, a first UL reference signal in a first UL reference signal port of the one or more UL reference signal ports, and a second UL reference signal in a second, different, UL reference signal port of the one or more UL reference signal ports, while receiving the first UL reference signal. The reference signal ports on which the first and second UL reference signals are received may indicate the reference signal ports preferred by the UE 115 for UL transmission.

The rank adaptation module 908 may also be configured to receive an explicit indication of the first quantity of transmission layers from the UE 115. For example, the first quantity of transmission layers may be included in an RRC message, a MAC-CE, or a CSI report received by the rank adaptation module 908 (e.g., through the transceiver 910). The explicit indication may indicate the number of transmission layers the UE 115 prefers to transmit UL communications on, and/or which reference signal ports the UE 115 prefers to use.

The indication received by the rank adaptation module 908 may indicate fewer UL reference signal ports than were included in the configuration transmitted by the rank adaptation module 908. For example, the indication may indicate the number of UL reference signal ports preferred by the UE, and the number may be less than all the UL reference signal ports indicated by the configuration. The indication may also indicate specific UL reference signal ports preferred by the UE 115, and the indicated reference signal ports may be less than all the UL reference signal ports indicated by the configuration.

The rank adaptation module 908 may also be configured to indicate a second multi-port UL reference signal resource in the configuration. For example, the configuration transmitted by the rank adaption module 908 may further indicate a second multi-port UL reference signal resource associated with a plurality of UL reference signal ports. The rank adaptation module 908 may receive from the UE 115, a second indication of a second quantity of transmission layers. The second indication may indicate one or more second UL reference signal ports of the plurality of UL reference signal ports associated with the second multi-port UL reference signal resource based on the second quantity of transmission layers and/or a second number of UL reference signal ports associated with the second multi-port UL reference signal resource based on the second quantity of transmission layers.

The rank adaptation module 908 may also be configured to receive (e.g., in coordination with the transceiver 910) transmit-antenna coherency change information from the UE 115. The rank adaptation module 908 may determine precoding information based on the transmit-antenna coherency change information. The rank adaptation module 908 may also determine a transmission rank indication based on the indication of the first quantity of transmission layers from the UE 115.

As shown, the transceiver 910 may include the modem subsystem 912 and the RF unit 914. The transceiver 910 can be configured to communicate bi-directionally with other devices, such as the UEs 115 and/or 800 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., DL reference signal configurations, SRS resource configuration, scheduling grants, CSI-RS, etc.) from the modem subsystem 912 (on outbound transmissions) or of transmissions originating from another source such as a UE 115 and/or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., RRC messages (including UAI), MAC-CEs, PUSCH signals, UL data, CSI reports, etc.) to the rank adaptation module 908 for processing. The antennas 916 may include multiple antennas of similar or different designs to sustain multiple transmission links.

In an example, the transceiver 910 is configured to receive from a UE 115 an indication of a first quantity of transmission layers. The indication indicates at least one of one or more first single-port uplink (UL) reference signal resources of a plurality of single-port UL reference signal resources or a number of single-port UL reference signal resources. The transceiver 910 is further configured to transmit, to the UE 115, an UL scheduling grant including an UL reference signal resource indicator associated with the first quantity of transmission layers.

In another example, the transceiver 910 is configured to receive from a UE 115 an uplink (UL) reference signal from one or more ports of a plurality of UL reference signal ports associated with a subset of a first multi-port UL reference signal resource. The transceiver is further configured to transmit, to the UE 115, a configuration indicating the first multi-port UL reference signal resource.

Figure 10:
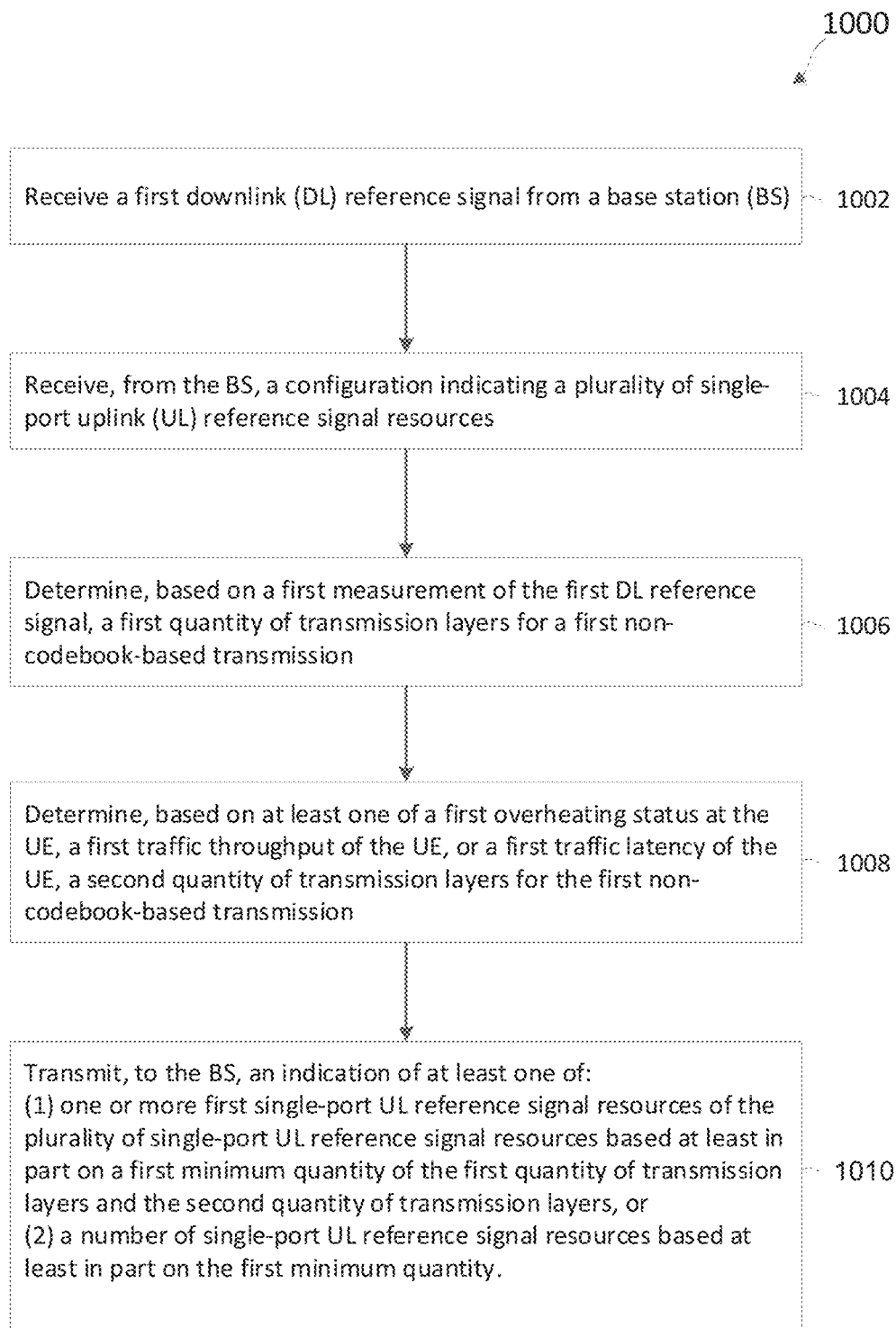
FIG. 10 is a flow diagram of wireless communication according to some aspects of the present disclosure.

FIG. 10 is a flow diagram of wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115 or 800, may utilize one or more components, such as the processor 802, the memory 804, the rank adaptation module 808, the transceiver 810, the modem 812, and the one or more antennas 816, to execute the steps of method 1000. The method 1000 may employ similar mechanisms as in the sequences 400 and 500 as described above with respect to FIGS. 4-5. As illustrated, the method 1000 includes several enumerated steps, but aspects of the method 1000 may include additional steps before, after, and in between the enumerated steps. In some aspects, one or more of the enumerated steps may be omitted or performed in a different order.

At block 1002 the UE 115 may receive a first DL reference signal (e.g., a CSI-RS) from a BS 105, which the UE 115 may use for channel measurement. In some instances, the UE 115 may utilize one or more components, such as the processor 802, the memory 804, the rank adaptation module 808, the transceiver 810, the modem 812, and the one or more antennas 816 to perform aspects of the block 1002.

At block 1004, the UE 115 may receive a configuration indicating a plurality of single-port UL reference signal resources (e.g., SRS resources) from the BS 105. The UL reference signal resources may be resources on which the UE 115 may transmit UL reference signals to the BS 105 and each single-port UL reference signal resource may correspond to a single layer on which the UE 115 may transmit UL data. In some instances, the UE 115 may utilize one or more components, such as the processor 802, the memory 804, the rank adaptation module 808, the transceiver 810, the modem 812, and the one or more antennas 816 to perform aspects of the block 1004.

At block 1006, the UE 115 may determine, based on a first measurement of the first DL reference signal received at block 1002, a first quantity of transmission layers for a first non-codebook-based transmission. The first quantity of transmission layers may be the maximum number of layers on which the UE 115 could reliably transmit data to the BS 105 under the current channel conditions. In some aspects, the UE 115 may also determine precoding information based on the first measurement of the first DL reference signal. The UE 115 may select the one or more first single-port UL reference signal resources from the plurality of single-port UL reference signal resources based on channel quality associated with the precoding information. For example, for a precoding matrix with four columns W0, W1, W2, and W3, the UE 115 may use a performance metric (e.g., RSRP) in measuring the DL reference signal to determine which column in the precoding matrix provides the best performance. The resulting precoding matrix (with the selected single column) can be used to encode an UL reference signal for transmission to the BS 105. In some instances, the UE 115 may utilize one or more components, such as the processor 802, the memory 804, and the rank adaptation module 808 to perform aspects of the block 1006.

At block 1008, the UE 115 may determine, based on at least one of a first overheating status at the UE, a first traffic throughput of the UE, or a first traffic latency of the UE 115, a second quantity of transmission layers for the first non-codebook-based transmission. For example, the overheating status may be triggered when the temperature of the UE 115 (or the UE's 115 battery) exceeds a threshold. The temperature may determined, for example, from a temperature sensor within the battery of the UE 115, or within a different component of the UE 115 (e.g., the processor 802). As another example, the UE 115 may determine the first quantity of transmission layers based on the first traffic throughput being high enough that the transmission rank can be reduced without a significant impact on performance, or based on the first latency of the UE 115 being low enough that the transmission rank can be reduced without a significant impact on performance. In some instances, the UE 115 may utilize one or more components, such as the processor 802, the memory 804, and the rank adaptation module 808 to perform aspects of the block 1008.

At block 1010, the UE may transmit, to the BS 105, an indication of at least one of: (1) one or more first single-port UL reference signal resources of the plurality of single-port UL reference signal resources based at least in part on a first minimum quantity of the first quantity of transmission layers and the second quantity of transmission layers, or (2) a number of single-port UL reference signal resources based at least in part on the first minimum quantity.

In some aspects, the UE 115 may transmit an implicit indication of the first minimum quantity of the first quantity and the second quantity of transmission layers by transmitting an UL reference signal in each UL reference signal resource of the one or more first single-port UL reference signal resources. The number of UL reference signals transmitted by the UE 115 may indicate the first quantity or the second quantity of transmission layers. The UE 115 may also implicitly indicate specific reference signal resources. For example, the UE 115 may transmit in a first UL reference signal resource of the one or more first single-port UL reference signal resources, a first UL reference signal (e.g., an SRS), and transmit in a second UL reference signal resource of the one or more first single-port UL reference signal resources after transmitting the first UL reference signal, a second UL reference signal, the first UL reference signal resource being different from the second UL reference signal resource. The UL reference signal resources on which the UL reference signals are transmitted may correspond to the resources on which the UE 115 prefers to transmit UL data.

In some aspects, the UE 115 may also transmit an explicit indication of the single-port UL reference signal resources (or the number of such resources) it prefers. For example, the UE 115 may include the indication (of a number of or of the actual resources) in an RRC message (e.g., including UAI), a MAC-CE message, or a CSI report. Whether implicit or explicit, the indication may include fewer single-port UL reference signal resources than were indicated by the configuration transmitted by the BS 105. For example, the UE 115 may transmit to the BS 105, the indication indicating less than all of the plurality of single-port UL reference signal resources indicated by the configuration. Or the UE 115 may transmit, to the BS 105, the indication indicating the number of single-port UL reference signal resources, wherein the number of single-port UL reference signal resources is less than all of the plurality of single-port UL reference signal resources indicated by the configuration.

In some aspects, the UE 115 may adjust the number of layers it uses for transmission (i.e., the transmission rank) periodically. For example, the UE 115 may increase the number of layers once the battery overheating status is reset (i.e., once the device temperature drops below a threshold), or if the traffic throughput decreases (e.g., below a threshold), or if the traffic latency increases (e.g., above a threshold). For example, the UE 115 may receive a second DL reference signal from the BS 105 and determine, based on a second measurement of the second DL reference signal, a third quantity of transmission layers for a second non-codebook-based transmission. The UE 115 may also determine based on at least one of a second overheating status at the UE 115, a second traffic throughput of the UE 115, or a second traffic latency of the UE 115, a fourth quantity of transmission layers for the second non-codebook-based transmission. The third quantity of transmission layers may be different from the first quantity of transmission layers, or the fourth quantity of transmission layers may be different from the second quantity of transmission layers. The UE 115 may then transmit to the BS 105 an indication of at least one of (1) one or more second single-port UL reference signal resources of the plurality of single-port UL reference signal resources based on a second minimum quantity of the third quantity of transmission layers and the fourth quantity of transmission layers, or (2) a second number of single-port UL reference signal resources based at least in part on the second minimum quantity.

In some aspects, the UE 115 may receive, from the BS 105, first scheduling information for only a first single-port UL reference signal resource of the plurality of single-port UL reference signal resources. The UE 115 may also receive, from the BS 105, second scheduling information for only a second single-port UL reference signal resource of the plurality of single-port UL reference signal resources. The UE 115 may then select, based on at least one of a throughput, a latency, or a spectrum efficiency associated with each of the first and second scheduling information, the one or more first single-port UL reference signal resources from the plurality of single-port UL reference signal resources. For example, after receiving the first scheduling information, the UE 115 may transmit a first indication of the first single-port UL reference signal resource. In response to the first indication, the UE 115 may receive the first scheduling information. The UE 115 may then transmit a second indication of the second single-port UL reference signal resource. In response to the second indication, the UE 115 may receive the second scheduling information. In some instances, the UE 115 may utilize one or more components, such as the processor 802, the memory 804, the rank adaptation module 808, the transceiver 810, the modem 812, and the one or more antennas 816 to perform aspects of the block 1010.

Figure 11:
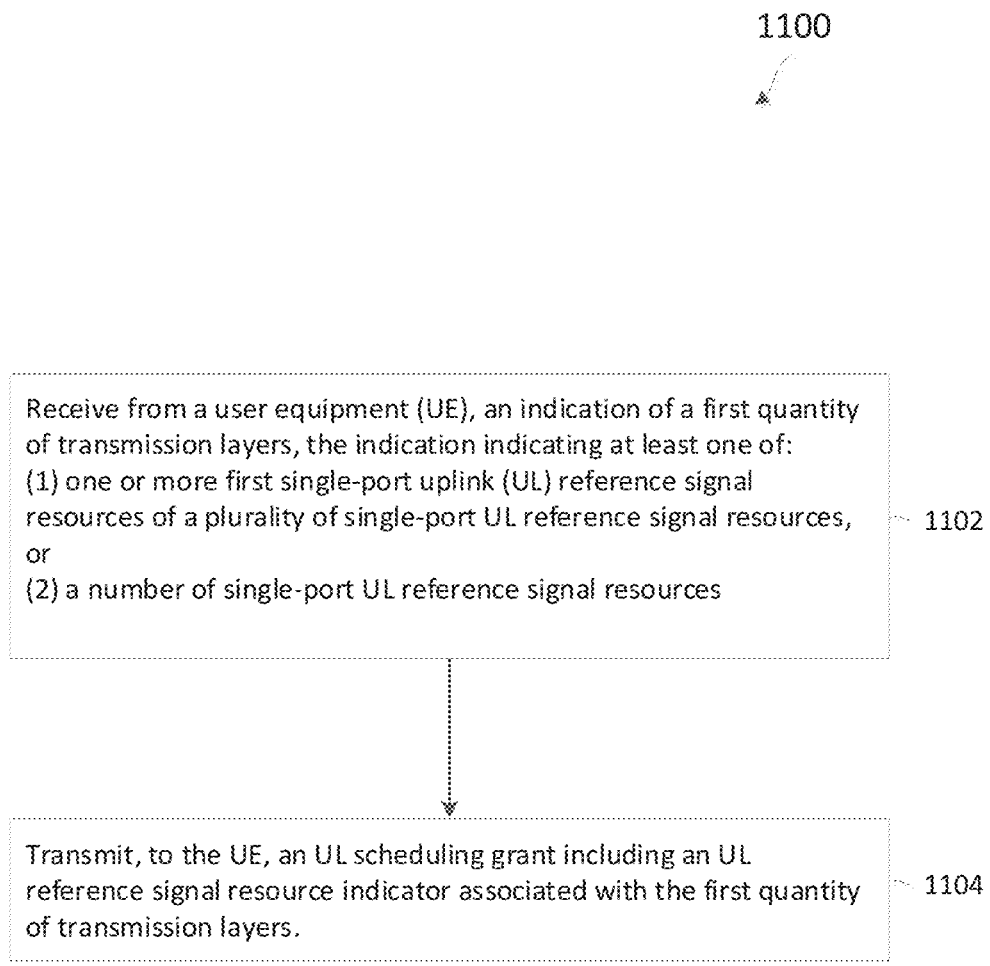
FIG. 11 is a flow diagram of wireless communication according to some aspects of the present disclosure.

FIG. 11 is a flow diagram of wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BS 105 or 900, may utilize one or more components, such as the processor 902, the memory 904, the rank adaptation module 908, the transceiver 910, the modem 912, and the one or more antennas 916, to execute the steps of method 1100. The method 1100 may employ similar mechanisms as in the sequences 400 and 500 as described above with respect to FIGS. 4-5. As illustrated, the method 1100 includes several enumerated steps, but aspects of the method 1100 may include additional steps before, after, and in between the enumerated steps. In some aspects, one or more of the enumerated steps may be omitted or performed in a different order.

At block 1102 the BS 105 may receive, from a UE 115, an indication of a first quantity of transmission layers on which the UE 115 prefers to transmit UL data (e.g., on the PUSCH). The indication may indicate at least one of (1) one or more first single-port UL reference signal resources (e.g., SRS resources) of a plurality of single-port UL reference signal resources, or (2) a number of single-port UL reference signal resources. The plurality of single-port UL reference signal resources from which the UE 115 may choose may be indicated in a configuration transmitted to the UE 115 by the BS 105. The indication may be based on channel measurement performed by the UE 115 in response to a DL reference signal (e.g., a CSI-RS) transmitted to the UE 115 by the BS 105. The indication received by the BS 105 may indicate fewer single-port UL reference signal resources than were indicated by the configuration. For example, the BS 105 may receive the indication from the UE 115 indicating less than all of the plurality of single-port UL reference signal resources indicated by the configuration. The BS 105 may also receive the indication indicating the number of single-port UL reference signal resources, wherein the number of single-port UL reference signal resources is less than all of the plurality of single-port UL reference signal resources indicated by the configuration.

In some aspects, the indication received by the BS 105 may be implicit. For example, the BS 105 may receive from the UE 115 an implicit indication of the first quantity of transmission layers by receiving an UL reference signal (e.g., an SRS) in each UL reference signal resource of the one or more first single-port UL reference signal resources. A number of UL reference signals transmitted by the UE indicates the first quantity of transmission layers (e.g., transmitting a single reference signal may indicate the UE 115 prefers to use a single transmission layer). The BS 105 may also receive an implicit indication of which specific single-port UL reference signal resources the UE 115 prefers. For example, the BS 105 may receive from the UE 115 in a first UL reference signal resource of the one or more first single-port UL reference signal resources, a first UL reference signal. The BS 105 may then receive from the UE 115 in a second UL reference signal resource of the one or more first single-port UL reference signal resources a second UL reference signal different from the first UL reference signal.

In some aspects, the indication received by the BS 105 may be explicit. For example, the first quantity of transmission layers may be included in an RRC message (including UAI), a MAC-CE, or a CSI report. The explicit indication may indicate the number of transmission layers the UE 115 prefers to transmit UL communications on, and/or which reference signal resources the UE 115 prefers to use.

In some aspects, the BS 105 may receive an additional indication from the UE 115 indicating a different quantity of transmission layers. For example, the BS 105 may receive a second indication of a second quantity of transmission layers different from the first quantity of transmission layers from the UE 115. The second indication may indicate at least one of (1) one or more second single-port UL reference signal resources of the plurality of single-port UL reference signal resources, or (2) a second number of single-port UL reference signal resources. The BS 105 may then transmit, to the UE 115, a second UL scheduling grant including a second UL reference signal resource indicator associated with the second quantity of transmission layers. In some instances, the BS 105 may utilize one or more components, such as the processor 902, the memory 904, the rank adaptation module 908, the transceiver 910, the modem 912, and the one or more antennas 916 to perform aspects of the block 1102.

At block 1104, the BS 115 may transmit, to the UE, an UL scheduling grant including an UL reference signal resource indicator (e.g., an SRI) associated with the first quantity of transmission layers. The UL scheduling grant may be transmitted, for example, in a PDCCH DCI transmission. The DCI may include the reference signal reference indicator in a field. In some instances, the BS 105 may utilize one or more components, such as the processor 902, the memory 904, the rank adaptation module 908, the transceiver 910, the modem 912, and the one or more antennas 916 to perform aspects of the block 1102.

Figure 12:
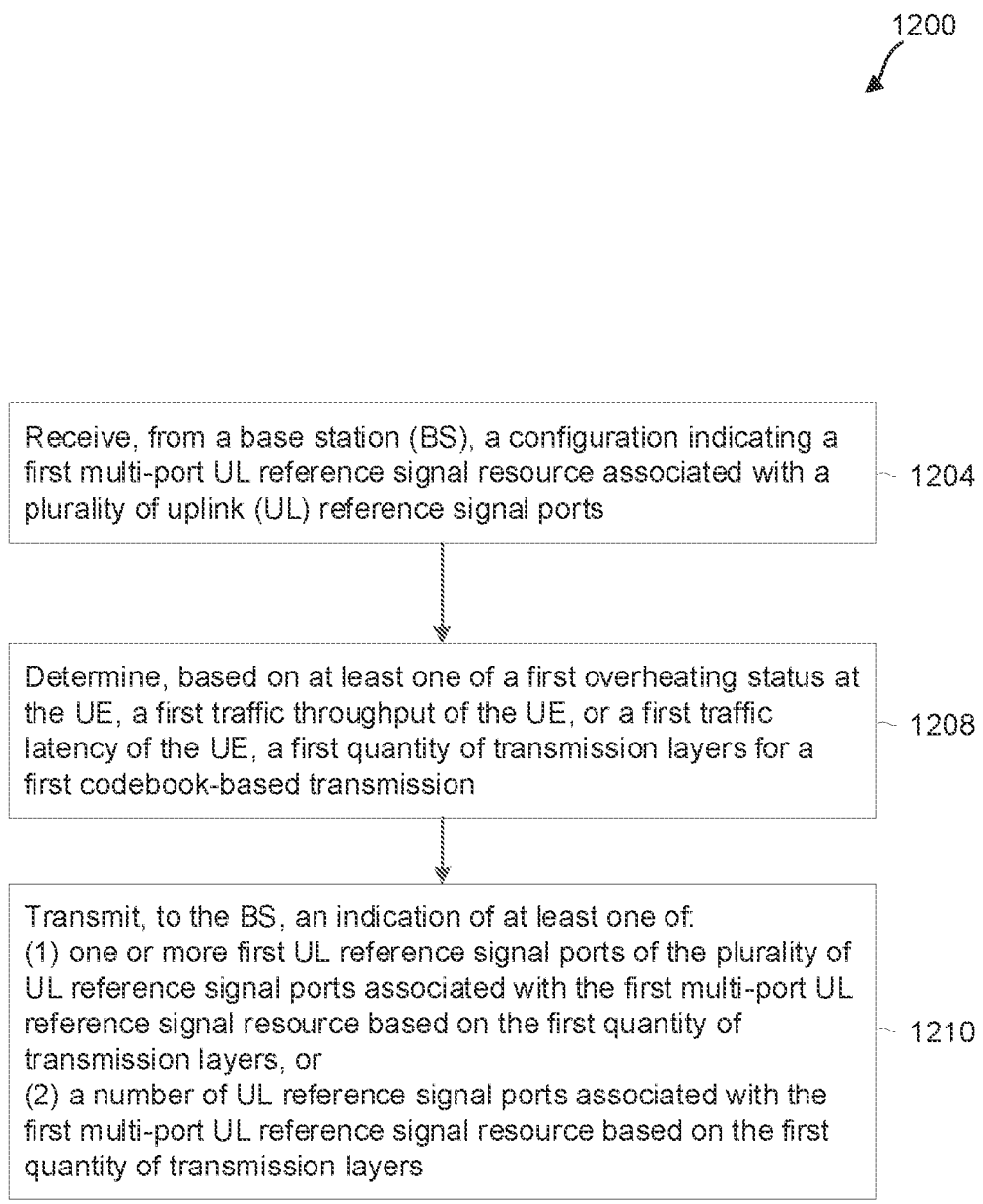
FIG. 12 is a flow diagram of wireless communication according to some aspects of the present disclosure.

FIG. 12 is a flow diagram of wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the UE 115 or 800, may utilize one or more components, such as the processor 802, the memory 804, the rank adaptation module 808, the transceiver 810, the modem 812, and the one or more antennas 816, to execute the steps of method 1200. The method 1200 may employ similar mechanisms as in the sequences 600 and 700 as described above with respect to FIGS. 6-7. As illustrated, the method 1200 includes several enumerated steps, but aspects of the method 1200 may include additional steps before, after, and in between the enumerated steps. In some aspects, one or more of the enumerated steps may be omitted or performed in a different order.

At block 1204, the UE 115 may receive from the BS 105 a configuration indicating a first multi-port UL reference signal resource (e.g., an SRS resource) associated with a plurality of UL reference signal ports. The UL reference signal resource may be a resource on which the UE may transmit UL reference signals to the BS, and each UL reference signal port may correspond to a layer on which an UL reference signal resource may be transmitted. In some instances, the UE 115 may utilize one or more components, such as the processor 802, the memory 804, the rank adaptation module 808, the transceiver 810, the modem 812, and the one or more antennas 816 to perform aspects of the block 1204.

At block 1208, the UE 115 may determine, based on at least one of a first overheating status at the UE, a first traffic throughput of the UE, or a first traffic latency of the UE 115, a first quantity of transmission layers for a first codebook-based transmission. For example, the overheating status may be triggered when the temperature of the UE 115 (or the UE's 115 battery) exceeds a threshold. The temperature may determined, for example, from a temperature sensor within the battery of the UE 115, or within a different component of the UE 115 (e.g., the processor 802). As another example, the UE 115 may determine the first quantity of transmission layers based on the first traffic throughput being high enough that the transmission rank can be reduced without a significant impact on performance, or based on the first latency of the UE 115 being low enough that the transmission rank can be reduced without a significant impact on performance. In some instances, the UE 115 may utilize one or more components, such as the processor 802, the memory 804, and the rank adaptation module 808 to perform aspects of the block 1208.

At block 1210, the UE 115 may transmit, to the BS 105, an indication of at least one of (1) one or more first UL reference signal ports of the plurality of UL reference signal ports associated with the first multi-port UL reference signal resource based on the first quantity of transmission layers, or (2) a number of UL reference signal ports associated with the first multi-port UL reference signal resource based on the first quantity of transmission layers. The UE 115 may select the one or more first UL reference signal ports from the plurality of UL reference signal ports based on a performance metric and/or the number of UL reference signal ports. The UE 115 may also determine the number of UL reference signal ports based on the first quantity of transmission layers.

The UE 115 may receive an UL grant from the BS 105 based on the indication. The UL grant may also be based on transmit-antenna coherency change information. For example, the UE 115 may transmit to the BS 105 transmit-antenna coherency change information. The transmit-antenna coherency change information may indicate a change from one of a no coherency mode, a partial coherency mode, or a full coherency mode to a different one of the no coherency mode, the partial coherency mode, or the full coherency mode. The UE 115 may receive from the BS 105 an UL scheduling grant including precoding information and a transmission rank indication, the precoding information being based on the transmit-antenna coherency change information, and the transmission rank indication being based on the transmitted indication.

In some aspects, the UE 115 may transmit to BS 105 an implicit indication of the one or more first UL reference signal ports by transmitting one or more UL reference signals (e.g. SRSs) in the first multi-port UL reference signal resource using the one or more first UL reference signal ports. The number of UL reference signals ports on which the first UL reference signal is transmitted indicates the first quantity of transmission layers. The UE 115 may also implicitly indicate specific UL reference signal ports by transmitting an UL reference signal on those ports. For example, the UE 115 may transmit to the BS 105 in a first UL reference signal port of the one or more UL reference signal ports, a first UL reference signal, and transmit, to the BS 105, in a second, different, UL reference signal port of the one or more UL reference signal ports, a second UL reference signal while transmitting the first UL reference signal. The UL reference signal ports on which the UE 115 transmits the UL reference signal may correspond to the UL reference signal ports on which the UE prefers to transmit UL data (e.g., communication signals).

In some aspects, the UE 115 may also transmit an explicit indication of the UL reference signal ports (or the number of such ports) it prefers. For example, the UE 115 may transmit to the BS 105 an explicit indication indicating the one or more first UL reference signal ports, wherein a quantity of the one or more first UL reference signal ports is the same as the first quantity of transmission layers. The UE 115 may also transmit to the BS 105 an explicit indication indicating the number of UL reference signal ports, wherein the number of UL reference signal ports is the same as the first quantity of transmission layers. The UE 115 may include the indication (of a number of or of the actual UL reference signal ports) in an RRC message (e.g., including UAI), a MAC-CE message, or a CSI report. Whether implicit or explicit, the indication may include fewer UL reference signal ports than were indicated by the configuration transmitted by the BS 105. For example, the UE 115 may transmit to the BS 105, the indication indicating less than all of the plurality of UL reference signal ports associated with the first multi-port UL reference signal resource indicated by the configuration. Or the UE 115 may transmit, to the BS 105, the indication indicating the number of UL reference signal ports, wherein the number of UL reference signal ports is less than all of the plurality of UL reference signal ports associated with the first multi-port UL reference signal resource indicated by the configuration.

In some aspects, the UE 115 may determine a second quantity of transmission layers for a second codebook-based transmission using a different multi-port UL reference signal resource. For example, the configuration (e.g., the configuration received at step 1204, or a different configuration) may further indicate a second multi-port UL reference signal resource associated with a plurality of UL reference signal ports. The UE 115 may determine, based on at least one of a second overheating status at the UE 115, a second traffic throughput of the UE 115, or a second traffic latency of the UE 115, a second quantity of transmission layers for a second codebook-based transmission. The UE 115 may then transmit to the BS 105 an indication of at least one of (1) one or more second UL reference signal ports of the plurality of UL reference signal ports associated with the second multi-port UL reference signal resource based on the second quantity of transmission layers, or (2) a second number of UL reference signal ports associated with the second multi-port UL reference signal resource based on the second quantity of transmission layers. In some instances, the UE 115 may utilize one or more components, such as the processor 802, the memory 804, the rank adaptation module 808, the transceiver 810, the modem 812, and the one or more antennas 816 to perform aspects of the block 1210.

Figure 13:
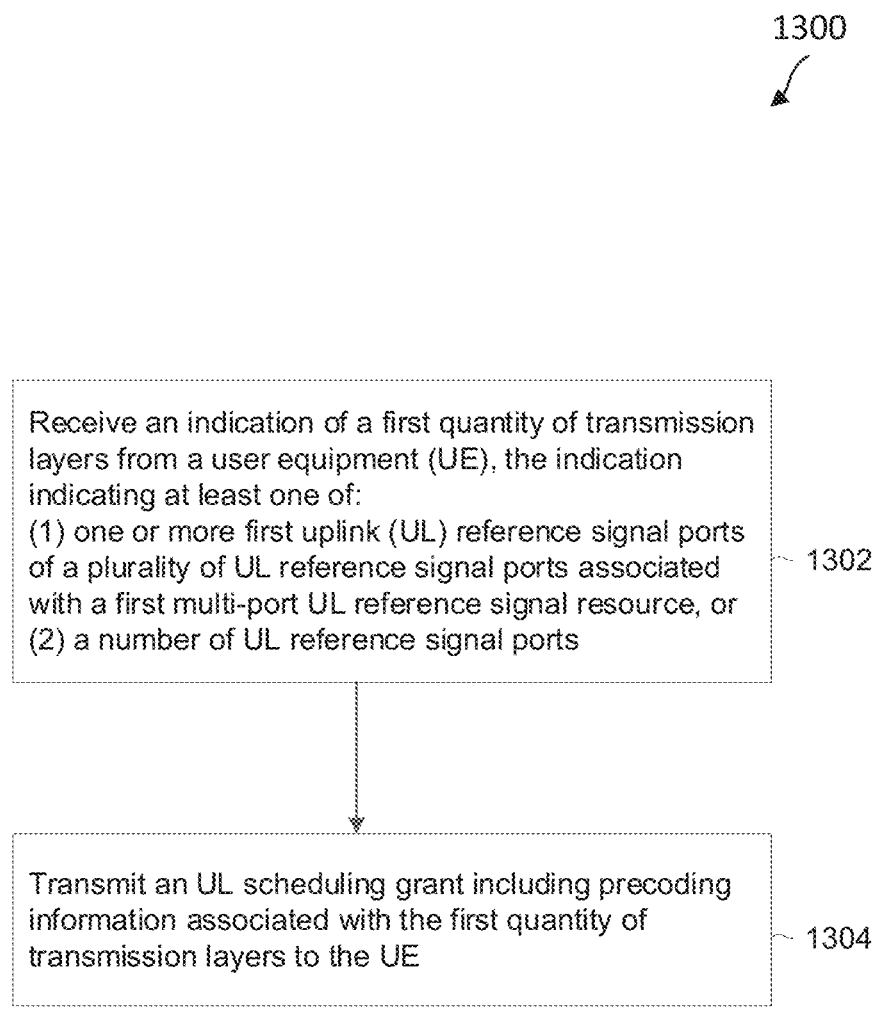
FIG. 13 is a flow diagram of wireless communication according to some aspects of the present disclosure.

FIG. 13 is a flow diagram of wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the BS 105 or 900, may utilize one or more components, such as the processor 902, the memory 904, the rank adaptation module 908, the transceiver 910, the modem 912, and the one or more antennas 916, to execute the steps of method 1300. The method 1300 may employ similar mechanisms as in the sequences 600 and 700 as described above with respect to FIGS. 6-7. As illustrated, the method 1300 includes several enumerated steps, but aspects of the method 1300 may include additional steps before, after, and in between the enumerated steps. In some aspects, one or more of the enumerated steps may be omitted or performed in a different order.

At block 1302 the BS 105 may receive, from a UE 115, an indication of a first quantity of transmission layers on which the UE 115 prefers to transmit UL data (e.g., on the PUSCH). The indication may indicate at least one of (1) one or more first UL reference signal ports (e.g., SRS ports) of a plurality of UL reference signal ports associated with a first multi-port UL reference signal resource, or (2) a number of UL reference signal ports. The first multi-port UL reference signal may be indicated in a configuration transmitted to the UE 115 by the BS 105.

The indication received by the BS 105 may indicate fewer UL reference signal ports than were indicated by the configuration. For example, the BS 105 may receive from the UE 115 the indication indicating less than all of the plurality of UL reference signal ports associated with the first multi-port UL reference signal resource indicated by the configuration. The BS 105 may also receive, from the UE 115, the indication indicating the number of UL reference signal ports, wherein the number of UL reference signal ports is less than all of the plurality of UL reference signal ports associated with the first multi-port UL reference signal resource indicated by the configuration.

In some aspects, the indication received by the BS 105 may be implicit. For example, the BS 105 may receive from the UE 115 an implicit indication of the one or more first UL reference signal ports by receiving one or more UL reference signals in the first multi-port UL reference signal resource using the one or more first UL reference signal ports, wherein a number of UL reference signals ports on which the first UL reference signal is transmitted indicates the first quantity of transmission layers. The BS 105 may also receive an implicit indication of the specific UL reference signal ports on which the UE 115 prefers to transmit. For example, the BS 115 may receive, from the UE 115, in a first UL reference signal port of the one or more UL reference signal ports, a first UL reference signal, and receive, from the UE 115 in a second, different, UL reference signal port of the one or more UL reference signal ports, a second UL reference signal while receiving the first UL reference signal. The UL reference signal ports on which the reference signal is received may indicate the UL reference signal ports on the which the UE 115 prefers to transmit.

In some aspects, the indication received by the BS 105 may be explicit. For example, the first quantity of transmission layers may be included in an RRC message (including UAI), a MAC-CE, or a CSI report. The explicit indication may indicate the number of transmission layers the UE 115 prefers to transmit UL communications on, and/or which UL reference signal ports the UE 115 prefers to use. The BS 105 may receive, from the UE 115, an explicit indication indicating the one or more first UL reference signal ports, wherein a quantity of the one or more first UL reference signal ports is the same as the first quantity of transmission layers. The BS 105 may also receive from the UE 115 an explicit indication indicating the number of UL reference signal ports, wherein the number of UL reference signal ports is the same as the first quantity of transmission layers.

In some aspects, the configuration may also include an indication of a second multi-port UL reference signal resource associated with a plurality of UL reference signal ports, and the BS 105 may receive a second indication of a second quantity of transmission layers. For example, the BS 105 may receive from the UE 115, a second indication of a second quantity of transmission layers, the indication indicating at least one of (1) one or more second UL reference signal ports of the plurality of UL reference signal ports associated with the second multi-port UL reference signal resource based on the second quantity of transmission layers, or (2) a second number of UL reference signal ports associated with the second multi-port UL reference signal resource based on the second quantity of transmission layers. In some instances, the BS 105 may utilize one or more components, such as the processor 902, the memory 904, the rank adaptation module 908, the transceiver 910, the modem 912, and the one or more antennas 916 to perform aspects of the block 1302.

At block 1304, the BS 115 may transmit, to the UE, an UL scheduling grant including precoding information (e.g., a TPMI) associated with the first quantity of transmission layers. The UL scheduling grant may be transmitted, for example, in a PDCCH DCI transmission. The UL scheduling grant may also include a TRI based on the indication received from the UE 115. The precoding information may be based on transmit-antenna coherency change information received from the UE 115. For example, the BS 105 may receive, from the UE 115, transmit-antenna coherency change information. The transmit-antenna coherency change information may indicate a change from one of a no coherency mode, a partial coherency mode, or a full coherency mode to a different one of the no coherency mode, the partial coherency mode, or the full coherency mode. The BS 105 may then transmit, to the UE 115, a UL scheduling grant including precoding information and a transmission rank indication, the precoding information being based on the transmit-antenna coherency change information, and the transmission rank indication being based on the received indication. In some instances, the BS 105 may utilize one or more components, such as the processor 902, the memory 904, the rank adaptation module 908, the transceiver 910, the modem 912, and the one or more antennas 916 to perform aspects of the block 1302.

Further aspects of the present disclosure include the following:

1. A method of wireless communication performed by a user equipment (UE), the method comprising:
    receiving, from a base station (BS), a configuration indicating a first multi-port uplink (UL) reference signal resource associated with a plurality of UL reference signal ports;
    determining, based on at least one of a first overheating status at the UE, a first traffic throughput of the UE, or a first traffic latency of the UE, a first quantity of transmission layers for a first codebook-based transmission; and
    transmitting, to the BS, an UL reference signal using one or more of the plurality of UL reference signal ports associated with the first multi-port UL reference signal resource based on the first quantity of transmission layers.

2. The method of aspect 1, wherein the transmitting comprises:
    transmitting, to the BS in a first UL reference signal port of the plurality of UL reference signal ports associated with the first multi-port UL reference signal resource, a first UL reference signal; and
    transmitting, to the BS in a second UL reference signal port of the plurality of UL reference signal ports associated with the first multi-port UL reference signal resource, a second UL reference signal while transmitting the first UL reference signal, the first UL reference signal port being different from the second UL reference signal port.

3. The method of any of aspects 1-2, further comprising:
    transmitting, to the BS, an indication indicating less than all of the plurality of UL reference signal ports associated with the first multi-port UL reference signal resource indicated by the configuration.

4. The method of aspect 3, wherein the transmitting the indication comprises:
    transmitting, to the BS, the indication indicating a number of UL reference signal ports, wherein the number of UL reference signal ports is less than all of the plurality of UL reference signal ports associated with the first multi-port UL reference signal resource indicated by the configuration.

5. The method of any of aspects 1-2, further comprising:
    transmitting, to the BS, an indication indicating a number of UL reference signal ports, wherein the number of UL reference signal ports is the same as the first quantity of transmission layers.

6. The method of any of aspects 1-5, further comprising:
    selecting, based on a performance metric based on historical data, the one or more of the plurality of UL reference signal ports associated with the first multi-port UL reference signal resource.

7. The method of any of aspects 1-6, further comprising:
    transmitting, to the BS, transmit-antenna coherency change information; and receiving an UL scheduling grant including a precoding information and a transmission rank indication, the precoding information being based on the transmit-antenna coherency change information, and the transmission rank indication being based on the transmitted UL reference signal.

8. The method of aspect 7, wherein the transmitting the transmit-antenna coherency change information comprises:
    transmitting, to the BS, the transmit-antenna coherency change information indicating a change from one of a no coherency mode, a partial coherency mode, or a full coherency mode to a different one of the no coherency mode, the partial coherency mode, or the full coherency mode.

9. A method of wireless communication performed by a base station (BS), the method comprising:
    transmitting, to a user equipment (UE), a configuration indicating a first multi-port UL reference signal resource.
    receiving, from the UE, an uplink (UL) reference signal from one or more of a plurality of UL reference signal ports associated with a subset of the first multi-port UL reference signal resource; and
    transmitting, to the UE, an UL scheduling grant including a precoding information associated with a first quantity of transmission layers.

10. The method of aspect 9, wherein the receiving comprises:
    receiving, from the UE in a first UL reference signal port of the plurality of UL reference signal ports associated with the subset of the first multi-port UL reference signal resource, a first UL reference signal; and
    receiving, from the UE in a second UL reference signal port of the plurality of UL reference signal ports associated with the subset of the first multi-port UL reference signal resource, a second UL reference signal while receiving the first UL reference signal, the first UL reference signal port being different from the second UL reference signal port.

11. The method of any of aspects 9-10, wherein:
the configuration indicating the first multi-port UL reference signal resource is a sounding reference signal (SRS) configuration.

12. The method of any of aspects 9-11, wherein the receiving comprises:
receiving, from the UE, an indication indicating less than all of the plurality of UL reference signal ports associated with the first multi-port UL reference signal resource indicated by the configuration.

13. The method of any of aspects 9-11, wherein the receiving comprises:
receiving, from the UE, an indication indicating the plurality of UL reference signal ports associated with the subset of the first multi-port UL reference signal resource, wherein a quantity of the plurality of UL reference signal ports associated with the subset of the first multi-port UL reference signal resource is the same as a first quantity of transmission layers.

14. The method of any of aspects 9-13, further comprising:
receiving, from the UE, transmit-antenna coherency change information; and
transmitting, in the UL scheduling grant, a transmission rank indication, the precoding information being based on the transmit-antenna coherency change information, and the transmission rank indication being based on the received UL reference signal.

15. The method of aspect 14, wherein the receiving the transmit-antenna coherency change information comprises:
receiving, from the UE, the transmit-antenna coherency change information indicating a change from one of a no coherency mode, a partial coherency mode, or a full coherency mode to a different one of the no coherency mode, the partial coherency mode, or the full coherency mode.

16. A user equipment (UE), comprising:
a transceiver configured to:
receive, from a base station (BS), a configuration indicating a first multi-port uplink (UL) reference signal resource associated with a plurality of UL reference signal ports; and
a processor configured to:
determine, based on at least one of a first overheating status at the UE, a first traffic throughput of the UE, or a first traffic latency of the UE, a first quantity of transmission layers for a first codebook-based transmission,
wherein the transceiver is further configured to transmit, to the BS, an UL reference signal using one or more of the plurality of UL reference signal ports associated with the first multi-port UL reference signal resource based on the first quantity of transmission layers.

17. The UE of aspect 16, wherein the transceiver is further configured to:
transmit, to the BS in a first UL reference signal port of the plurality of UL reference signal ports associated with the first multi-port UL reference signal resource, a first UL reference signal; and transmit, to the BS in a second UL reference signal port of the plurality of UL reference signal ports associated with the first multi-port UL reference signal resource, a second UL reference signal while transmitting the first UL reference signal, the first UL reference signal port being different from the second UL reference signal port.

18. The UE of any of aspects 15-16, wherein the transceiver is further configured to:
transmit, to the BS, an indication indicating less than all of the plurality of UL reference signal ports associated with the first multi-port UL reference signal resource indicated by the configuration.

19. The UE of aspect 18, wherein the transceiver is further configured to:
transmit, to the BS, the indication indicating a number of UL reference signal ports, wherein the number of UL reference signal ports is less than all of the plurality of UL reference signal ports associated with the first multi-port UL reference signal resource indicated by the configuration.

20. The UE of any of aspects 15-16, wherein the transceiver is further configured to:
transmit, to the BS, an indication indicating a number of UL reference signal ports, wherein the number of UL reference signal ports is the same as the first quantity of transmission layers.

21. The UE of any of aspects 16-20, wherein the processor is further configured to:
select, based on a performance metric based on historical data, the one or more of the plurality of UL reference signal ports associated with the first multi-port UL reference signal resource.

22. The UE of any of aspects 16-21, wherein the transceiver is further configured to:
transmit, to the BS, transmit-antenna coherency change information; and receive an UL scheduling grant including a precoding information and a transmission rank indication, the precoding information being based on the transmit-antenna coherency change information, and the transmission rank indication being based on the transmitted UL reference signal.

23. The UE of aspect 22, wherein the transceiver is further configured to:
transmit, to the BS, the transmit-antenna coherency change information indicating a change from one of a no coherency mode, a partial coherency mode, or a full coherency mode to a different one of the no coherency mode, the partial coherency mode, or the full coherency mode.

24. A base station (BS), comprising a transceiver configured to:
transmit, to a user equipment (UE), a configuration indicating a first multi-port UL reference signal resource,
receive, from the UE, an uplink (UL) reference signal from one or more of a plurality of UL reference signal ports associated with a subset of the first multi-port UL reference signal resource, and
transmit, to the UE, an UL scheduling grant including a precoding information associated with a first quantity of transmission layers.

25. The BS of aspect 24, wherein the transceiver is further configured to:
receive, from the UE in a first UL reference signal port of the one or more of the plurality of UL reference signal ports associated with the subset of the first multi-port UL reference signal resource, a first UL reference signal; and receive, from the UE in a second UL reference signal port of the one or more of the plurality of UL reference signal ports associated with the subset of the first multi-port UL reference signal resource, a second UL reference signal while receiving the first UL reference signal, the first UL reference signal port being different from the second UL reference signal port.

26. The BS of any of aspects 24-25, wherein the configuration indicating the first multi-port UL reference signal resource is a sounding reference signal (SRS) configuration.

27. The BS of any of aspects 24-26, wherein the transceiver is further configured to:
receive, from the UE, an indication indicating less than all of the plurality of UL reference signal ports associated with the first multi-port UL reference signal resource indicated by the configuration.

28. The BS of any of aspects 24-26, wherein the transceiver is further configured to:
receive, from the UE, an indication indicating the one or more of the plurality of UL reference signal ports associated with the subset of the first multi-port UL reference signal resource, wherein a quantity of the one or more of the plurality of UL reference signal ports associated with the subset of the first multi-port UL reference signal resource is the same as a first quantity of transmission layers.

29. The BS of any of aspects 24-28, wherein the transceiver is further configured to:
receive, from the UE, transmit-antenna coherency change information; and
transmit, in the UL scheduling grant, a transmission rank indication, the precoding information being based on the transmit-antenna coherency change information, and the transmission rank indication being based on the received UL reference signal.

30. The BS of aspect 29, wherein the transceiver is further configured to:
receive, from the UE, the transmit-antenna coherency change information indicating a change from one of a no coherency mode, a partial coherency mode, or a full coherency mode to a different one of the no coherency mode, the partial coherency mode, or the full coherency mode.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
receiving, from a base station (BS), a configuration indicating a first multi-port uplink (UL) reference signal resource associated with a plurality of UL reference signal ports;
transmitting, to the BS, an UL reference signal using a quantity of the plurality of UL reference signal ports associated with the first multi-port UL reference signal resource, wherein the quantity is based on a performance metric, based on historical data, and at least one of:
a first overheating status at the UE,
a first traffic throughput of the UE, or
a first traffic latency of the UE;
transmitting, to the BS, transmit-antenna coherency change information; and
receiving an UL scheduling grant including a precoding information and a transmission rank indication, the precoding information being based on the transmit-antenna coherency change information, and the transmission rank indication being based on the transmitted UL reference signal.

2. The method of claim 1, wherein the transmitting comprises:
transmitting, to the BS in a first UL reference signal port of the plurality of UL reference signal ports associated with the first multi-port UL reference signal resource, a first UL reference signal; and
transmitting, to the BS in a second UL reference signal port of the plurality of UL reference signal ports associated with the first multi-port UL reference signal resource, a second UL reference signal while transmitting the first UL reference signal, the first UL reference signal port being different from the second UL reference signal port.

3. The method of claim 1, further comprising:
transmitting, to the BS, an indication indicating less than all of the plurality of UL reference signal ports associated with the first multi-port UL reference signal resource indicated by the configuration.

4. The method of claim 3, wherein the transmitting the indication comprises:
transmitting, to the BS, the indication indicating a number of UL reference signal ports, wherein the number of UL reference signal ports is less than all of the plurality of UL reference signal ports associated with the first multi-port UL reference signal resource indicated by the configuration.

5. The method of claim 1, further comprising:
transmitting, to the BS, an indication indicating the quantity of the plurality of UL reference signal ports.

6. The method of claim 1, wherein the transmitting the transmit-antenna coherency change information comprises:
transmitting, to the BS, the transmit-antenna coherency change information indicating a change from one of a no coherency mode, a partial coherency mode, or a full coherency mode to a different one of the no coherency mode, the partial coherency mode, or the full coherency mode.

7. A user equipment (UE), comprising:
a transceiver;
one or more memories; and
one or more processors coupled to the one or more memories and the transceiver, the one or more memories storing instructions that are executable by the one or more processors, configured individually or in any combination, to cause the UE to:
receive, from a base station (BS), a configuration indicating a first multi-port uplink (UL) reference signal resource associated with a plurality of UL reference signal ports;
transmit, to the BS, an UL reference signal using a quantity of the plurality of UL reference signal ports associated with the first multi-port UL reference signal resource, wherein the quantity is based on a performance metric, based on historical data, and at least one of:
a first overheating status at the UE,
a first traffic throughput of the UE, or
a first traffic latency of the UE;
transmit, to the BS, transmit-antenna coherency change information; and
receive an UL scheduling grant including a precoding information and a transmission rank indication, the precoding information being based on the transmit-antenna coherency change information, and the transmission rank indication being based on the transmitted UL reference signal.

8. The UE of claim 7, wherein the one or more processors are further configured, individually or in any combination to cause the UE to:
transmit, to the BS in a first UL reference signal port of the plurality of UL reference signal ports associated with the first multi-port UL reference signal resource, a first UL reference signal; and
transmit, to the BS in a second UL reference signal port of the plurality of UL reference signal ports associated with the first multi-port UL reference signal resource, a second UL reference signal while transmitting the first UL reference signal, the first UL reference signal port being different from the second UL reference signal port.

9. The UE of claim 7, wherein the one or more processors are further configured, individually or in any combination to cause the UE to:
transmit, to the BS, an indication indicating less than all of the plurality of UL reference signal ports associated with the first multi-port UL reference signal resource indicated by the configuration.

10. The UE of claim 9, wherein the one or more processors are further configured, individually or in any combination to cause the UE to:
transmit, to the BS, the indication indicating a number of UL reference signal ports, wherein the number of UL reference signal ports is less than all of the plurality of UL reference signal ports associated with the first multi-port UL reference signal resource indicated by the configuration.

11. The UE of claim 7, wherein the one or more processors are further configured, individually or in any combination to cause the UE to:
transmit, to the BS, an indication indicating the quantity of the plurality of UL reference signal ports.

12. The UE of claim 7, wherein the one or more processors are further configured, individually or in any combination to cause the UE to:
transmit, to the BS, the transmit-antenna coherency change information indicating a change from one of a no coherency mode, a partial coherency mode, or a full coherency mode to a different one of the no coherency mode, the partial coherency mode, or the full coherency mode.

13. A non-transitory computer-readable medium having program code recorded thereon, the program code comprising:
code for causing a user equipment (UE) to receive, from a base station (BS), a configuration indicating a first multi-port uplink (UL) reference signal resource associated with a plurality of UL reference signal ports;
code for causing the UE to transmit, to the BS, an UL reference signal using a quantity of the plurality of UL reference signal ports associated with the first multi-port UL reference signal resource, wherein the quantity is based on a performance metric, based on historical data, and at least one of:
a first overheating status at the UE,
a first traffic throughput of the UE, or
a first traffic latency of the UE;
code for causing the UE to transmit, to the BS, transmit-antenna coherency change information; and
code for causing the UE to receive an UL scheduling grant including a precoding information and a transmission rank indication, the precoding information being based on the transmit-antenna coherency change information, and the transmission rank indication being based on the transmitted UL reference signal.

14. A user equipment (UE), comprising:
means for receiving, from a base station (BS), a configuration indicating a first multi-port uplink (UL) reference signal resource associated with a plurality of UL reference signal ports;
means for transmitting, to the BS, an UL reference signal using a quantity of the plurality of UL reference signal ports associated with the first multi-port UL reference signal resource, wherein the quantity is based on a performance metric, based on historical data, and at least one of:
a first overheating status at the UE,
a first traffic throughput of the UE, or
a first traffic latency of the UE;
means for transmitting, to the BS, transmit-antenna coherency change information; and
means for receiving an UL scheduling grant including a precoding information and a transmission rank indication, the precoding information being based on the transmit-antenna coherency change information, and the transmission rank indication being based on the transmitted UL reference signal.

* * * * *